US008229470B1

(12) United States Patent
Ranjan et al.

(10) Patent No.: US 8,229,470 B1
(45) Date of Patent: Jul. 24, 2012

(54) CORRELATING USER INTERESTS AND LOCATION IN A MOBILE NETWORK

(75) Inventors: Supranamaya Ranjan, Albany, CA (US); Antonio Nucci, San Jose, CA (US); Aleksandar Kuzmanovic, Evanston, IL (US); Ionut Trestian, Evanston, IL (US)

(73) Assignee: Narus, Inc., Sunnyvale, CA (US)

( * ) Notice: Subject to any disclaimer, the term of this patent is extended or adjusted under 35 U.S.C. 154(b) by 90 days.

(21) Appl. No.: 12/910,731

(22) Filed: Oct. 22, 2010

(51) Int. Cl.
*H04W 24/00* (2009.01)

(52) U.S. Cl. .................. 455/456.3; 709/203; 709/223; 709/207; 715/757; 705/710

(58) Field of Classification Search .................. None
See application file for complete search history.

(56) References Cited

U.S. PATENT DOCUMENTS

| | | | | |
|---|---|---|---|---|
| 7,096,030 | B2 * | 8/2006 | Huomo ................. | 455/456.3 |
| 7,917,580 | B2 * | 3/2011 | Sim et al. .................. | 709/203 |
| 8,005,906 | B2 * | 8/2011 | Hayashi et al. ............. | 709/206 |
| 8,108,501 | B2 * | 1/2012 | Birnie et al. ................ | 709/223 |
| 2004/0162090 | A1 * | 8/2004 | Suryanarayana et al. . | 455/456.5 |
| 2004/0172409 | A1 * | 9/2004 | James ......................... | 707/104.1 |
| 2006/0022048 | A1 * | 2/2006 | Johnson ...................... | 235/462.1 |
| 2007/0270166 | A1 * | 11/2007 | Hampel et al. ............. | 455/456.3 |
| 2009/0125230 | A1 * | 5/2009 | Sullivan ...................... | 701/207 |
| 2009/0177523 | A1 * | 7/2009 | Routtenberg ................ | 705/10 |
| 2009/0298513 | A1 * | 12/2009 | Hampel et al. ............. | 455/456.1 |
| 2010/0057562 | A1 * | 3/2010 | Gabbay ....................... | 705/14.52 |
| 2010/0131584 | A1 * | 5/2010 | Johnson ....................... | 709/203 |

OTHER PUBLICATIONS

Verhein, F., et al, "Mining Spatio-Temporal Association Rules, Sources, Sinks, Stationary Regions and Thoroughfares in Object Mobility Databases".
In Proc. of the 11th International Conference on Database Systems for Advanced Applications, 2006.
Malik, Jitendra, et al., "Contour and Texture Analysis for Image Segmentation", International Journal of Computer Vision 43(1), pp. 7-27, 2001, Kluwer Academic Publishers, The Netherlands.
Eagle, Nathan, "Reality mining: sensing complex social systems", Pers Ubiquit Comput (2006) 10, pp. 255-268, Published online: Nov. 3, 2005, Springer-Verlag London Limited 2005.
Golle, Philippe, et al., "On the Anonymity of Home/Work Location Pairs",Proceedings of the 7th International Conference on Pervasive Computing, May 11-14, 2009, Nara, Japan.
Miklas, Andrew G., et al. "Exploiting Social Interactions in Mobile Systems". In UBICOMP (Ubiquitous Computing), Innsbruck, Austria, Sep. 2007.
Kandula, Srikanth, et al., "What's Going on? Learning Communication Rules in Edge Networks". In Proceedings of SIGCOMM 2008, Aug. 17-22, 2008, Seattle, WA.

(Continued)

*Primary Examiner* — Jinsong Hu
*Assistant Examiner* — Benjamin Morales Fernandez
(74) *Attorney, Agent, or Firm* — Fernandez & Associates, LLP

(57) ABSTRACT

A method for providing location based service in a cellular data service network (CDSN) by analyzing accounting data packets of the CDSN to determine a user mobility pattern, classifying application data packets of the CDSN into pre-determined application categories, analyzing the accounting data packets and the application data packets to associate the user mobility pattern and one of the pre-determined application category, comparing a newly received accounting data packet and the user mobility pattern to identify a match, and providing, in response to identifying the match, the location based service to a user based on the pre-determined application category.

18 Claims, 9 Drawing Sheets

OTHER PUBLICATIONS

Spielmat, Daniel A., et al, "Spectral partitioning works: planar graphs and finite element meshes", Proceedings of the 37th Annual Symposium on Foundations of Computer Science, p. 96, Oct. 14-16, 1996.

Agrawal Rakesh, et al., "Mining Sequential Patterns", Proceedings of the Eleventh International Conference on Data Engineering, pp. 3-14, Mar. 6-10, 1995.

Karagiannis, Thomas, et al., "Power law and exponential decay of inter contact times between mobile devices", Proceedings of the 13th annual ACM in international conference on Mobile computing and networking, Sep. 9-14, 2007, Montréal, Québec, Canada.

Brockman, D. et al., . Brockmann, L. Hufnagel, and T. Geisel. The Scaling Laws of Human Travel. In Nature, 439(7075), Jan. 2006.

Gonzalez, M., et al., "Understanding Individual Human Mobility Patterns". In Nature, 453(7196), Jun. 2008.

Dhillon, Inderjit S., Co-clustering documents and words using bipartite spectral graph partitioning, Proceedings of the seventh ACM SIGKDD international conference on Knowledge discovery and data mining, p. 269-274, Aug. 26-29, 2001, San Francisco, California.

Kernighan, B., et al., "An Efficient Heuristic Procedure for Partitioning Graphs". In the Bell System Techincal Journal, vol. 29, 1970.

Chaintreau, Augustin, et al., "Impact of Human Mobility on the Design of Opportunistic Forwarding Algorithms", IEEE Transactions on Mobile Computing, v.6 n.6, pp. 606-620, Jun. 2007.

Lee, Kyunghan, et al. "SLAW: A Mobility Model for Human Walks". In INFOCOM, Rio de Janeiro, Brazil, Apr. 2009.

* cited by examiner c) Non Hotspot application accesses d) Hotspot locations during non-hotspot times

CORRELATING USER INTERESTS AND LOCATION IN A MOBILE NETWORK

BACKGROUND OF THE INVENTION

Recent advances in technology allow mobile devices to find their physical location via a multitude of methods: cell tower look up, cell tower triangulation, cell tower and Wi-Fi access point triangulation and Global Positioning System (GPS), with varying accuracy levels. Besides the use of location estimation for navigation services, a location-based service (LBS) is an information and entertainment service, accessible with mobile devices through the mobile network and utilizing the ability to make use of the geographical position of the mobile device. LBS services can be used in a variety of contexts, such as health, work, personal life, etc. LBS services include services to identify a location of a person or object, such as discovering the nearest banking cash machine or the whereabouts of a friend or employee. LBS services include parcel tracking and vehicle tracking services. LBS can include mobile commerce when taking the form of coupons or advertising directed at customers based on their current location. LBS can include personalized weather services and even location-based games.

A new class of LBS, referred to as "serendipitous" location-based services, have also gained popularity. These services and applications allow users to serendipitously, i.e., accidentally discover user, businesses and other locations around them that match their interests. A user can look up who else is in proximity and depending on common interests, can decide to communicate. Furthermore, location tagging services allow a user to leave interesting tags about a particular geographic location, e.g., photos or snippets about current events, etc., and then other users who are in vicinity of that location could be automatically prompted with those geo-tags. Finally, location-based advertising allows a retailer to send advertisements to users on detecting that a user, who previously opted-in to the service, has entered the "geo-fence" area around the retailer. The fundamental questions relevant to these serendipitous location-based services remain yet unanswered. For instance, how likely is it to meet in users' daily lives, and where, with user who share similar interests in cyber domain? What role does user's physical location play in terms of what they access online from there?

SUMMARY

In general, in one aspect, the invention relates to a method for providing location based service in a cellular data service network (CDSN) having a plurality of base stations. The method includes obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets, analyzing, using a central processing unit (CPU) of a computer, the plurality of accounting data packets to determine a user mobility pattern representing a statistical pattern of time correlated user base station connections of at least the portion of the users in the CDSN, classifying, using the CPU, each of the plurality of application data packets as belonging to one or more of a plurality of pre-determined application categories based on keyword search, analyzing, using the CPU, the plurality of accounting data packets and the plurality of application data packets, based on network addresses and timestamps contained therein, to associate the user mobility pattern and a pre-determined application category of the plurality of pre-determined application categories, comparing, in response to receiving by the CDSN an accounting data packet associated with a first user of the users, the accounting data packet and the user mobility pattern to identify a match, and providing, in response to identifying the match, the location based service to the first user based on the pre-determined application category.

In general, in one aspect, the invention relates to a system for providing location based service in a cellular data service network (CDSN) including a plurality of base stations of the CDSN, a processor, and memory storing instructions, when executed by the processor, comprising functionalities for obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets, analyzing the plurality of accounting data packets to determine a user mobility pattern representing a statistical pattern of time correlated user base station connections of at least the portion of the users in the CDSN, classifying each of the plurality of application data packets as belonging to one or more of a plurality of pre-determined application categories based on keyword search, analyzing the plurality of accounting data packets and the plurality of application data packets, based on network addresses and timestamps contained therein, to associate the user mobility pattern and a pre-determined application category of the plurality of pre-determined application categories, comparing, in response to receiving by the CDSN an accounting data packet associated with a first user of the users, the accounting data packet and the user mobility pattern to identify a match, and providing, in response to identifying the match, the location based service to the first user based on the pre-determined application category.

In general, in one aspect, the invention relates to a non-transitory computer readable medium storing instructions for providing location based service in a cellular data service network (CDSN) having a plurality of base stations. The instructions, when executed by a processor of a computer, comprising functionality for obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets, analyzing, using a central processing unit (CPU) of a computer, the plurality of accounting data packets to determine a user mobility pattern representing a statistical pattern of time correlated user base station connections of at least the portion of the users in the CDSN, classifying, using the CPU, each of the plurality of application data packets as belonging to one or more of a plurality of pre-determined application categories based on keyword search, analyzing, using the CPU, the plurality of accounting data packets and the plurality of application data packets, based on network addresses and timestamps contained therein, to associate the user mobility pattern and a pre-determined application category of the plurality of pre-determined application categories, comparing, in response to receiving by the CDSN an accounting data packet associated with a first user of the users, the accounting data packet and the user mobility pattern to identify a match, and providing, in response to identifying the match, the location based service to the first user based on the pre-determined application category.

Other aspects and advantages of the invention will be apparent from the following description and the appended claims.

DETAILED DESCRIPTION

Figure 1A:
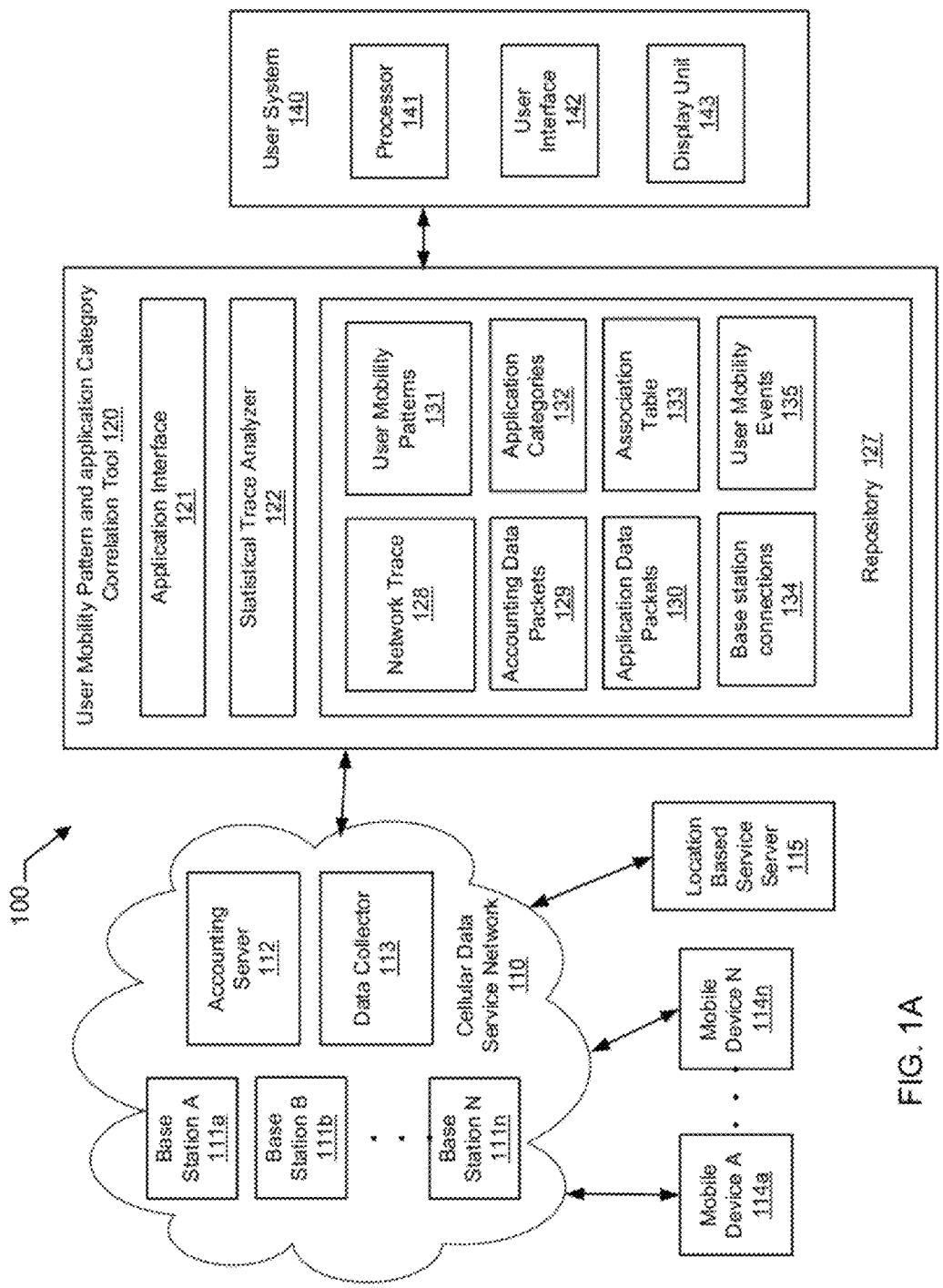
FIG. 1A shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In summary, embodiments of the invention advantageously identify the relationship between users' mobility properties (e.g., user mobility patterns described below) in a cellular data service network (CDSN) and their affiliations (e.g., based on interests) towards particular applications (e.g., represented as application categories described below) in cyber domain. In particular, the applications are Web applications accessed by the CDSN subscriber users via Internet connections over the CDSN. Specifically, the users' mobility properties and application affiliations are determined based on the user CDSN connection patterns and Web access patterns. For example, the user CDSN connection patterns and Web access patterns extracted from a network trace for over 280,000 clients of a 3G mobile network in a large metropolitan area during a one-week period is described below. In one or more embodiments, the application affiliations are determined by classifying URLs (e.g., Universal Resource Locators extracted from the Web accesses) accessed by the subscriber users into broad categories such as social networking, dating, music, gaming, trading, etc. In one or more embodiments, the mobility patterns are determined by extracting the time-sequence of CDSN base stations accessed by the subscriber users. In one or more embodiments, the relationships between such users' mobility properties and application affiliations are determined using association rule-mining techniques. In one or more embodiments, LBSs are provided to users based on such relationships. For example, such users' mobility properties may indicate a hotspot and a particular type of application (e.g., social networking, dating, music, gaming, trading, etc.) is selected and/or configured (e.g., information associated with the application may be cached at the base station of the hotspot, quality of service (QOS) of the application may be enhanced for the application at the base station of the hotspot) based on the relationship to enhance user experience of the application when the user enters the hotspot.

FIG. 1A shows a diagram of a system (100) for associating user mobility patterns and application categories in a cellular data service network (CDSN) in accordance with one or more embodiments. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1.

As shown in FIG. 1A, the system (100) includes a user mobility pattern and application category correlation tool (120), a user system (140), a cellular data service network (CDSN) (110), a location based service server (115), and user mobile devices (e.g., mobile device A (114a), mobile device N (114n), etc.). The correlation tool (120) includes a data storage repository (127), one or more application interface(s) (121), and a statistical trace analyzer (122). The CDSN (110) includes base stations (e.g., base station A (114a), base station B (114b), base station N (114n), etc.), an accounting server (112), and a data collector (113). The user system (140) includes a processor (141), a user interface (142), and, a display unit (143). Each of these components is described below.

In one or more embodiments of the invention, the CDSN (110) may be one of a variety of networks providing data communication functionality to subscribers via user mobile devices (e.g., mobile device A (114a), mobile device N (114n), etc.). In one or more embodiments, the user mobile devices (e.g., mobile device A (114a), mobile device N (114n), etc.) may be a smart phone, a digital assistant, a notebook computer, a laptop computer, a tablet computer, a gaming console, or other electronic device configured with wireless connectivity. The CDSN (110) may include, but is not limited to, a cellular network where a number of cellular zones each with pre-determined local coverage that collectively provide communication functionality to subscribers moving about within an overall network coverage area. In one or more embodiments, each cellular zone is associated with a base station (e.g., base station A (114a), base station N (114n), etc.) for connecting a user mobile device (e.g., mobile device A (114a)) to the CDSN (110) when the user mobile device (e.g., mobile device A (114a)) is within the corresponding cellular zone. For example, the CDSN (110) may include one or more of a cellular phone network, a Wi-Fi network, a WiMax (Worldwide Interoperability for Microwave Access) network, a 3GPP LTE (Third. Generation Partnership Project Long Term Evolution) network, or combinations thereof while the base stations (e.g., base station A (114a), base station N. (114n), etc.) may include one or more of a cellular phone network base station, a Wi-Fi access point, a WiMax base station, a 3GPP LTE base station, or combinations thereof.

Figure 1B:
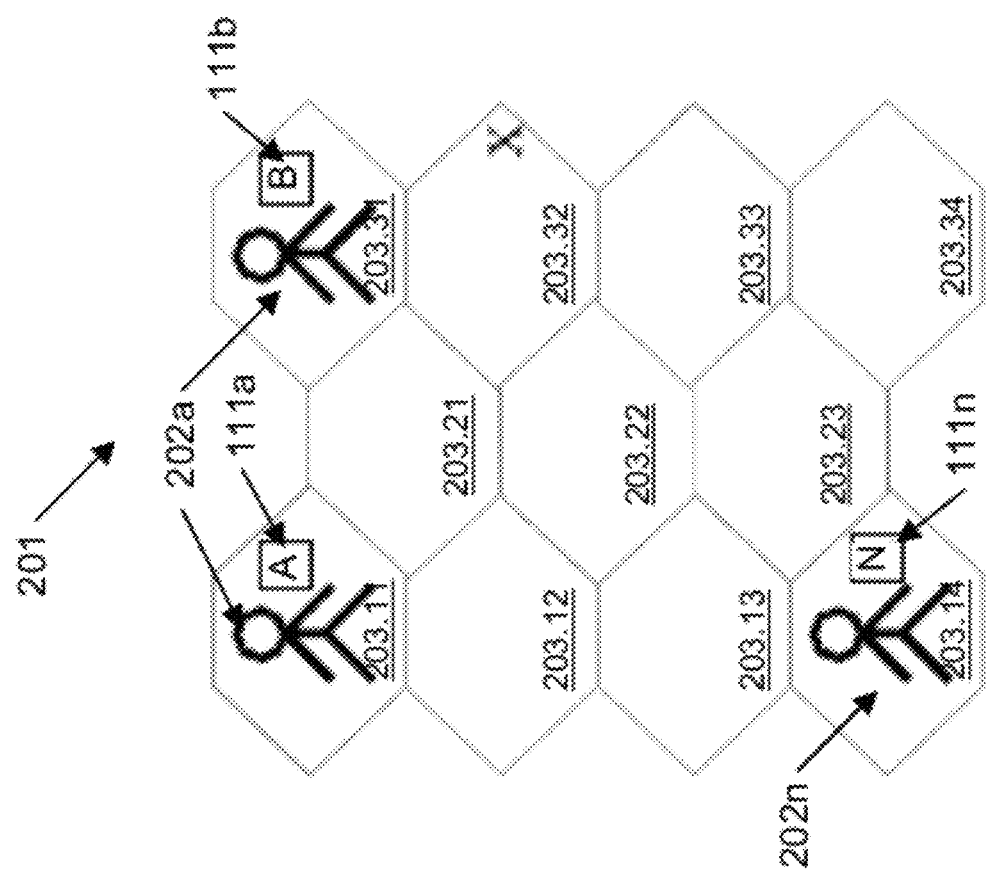
FIG. 1B shows a schematic diagram of an example cellular data service network according to aspects of the invention.

FIG. 1B shows an example network coverage area (201) of a portion of the CDSN (110) depicted in FIG. 1A. As shown, the network coverage area (201) includes the cellular zones (203.11) through (203.34) each shown as a hexagon shaped area representing local coverage thereof. In addition, the cellular zones (203.11), (203.31), and (203.14) are shown to be serviced by the base station A (111a), base station B (111b), and base station N (111n), respectively, of FIG. 1A. For example, the area serviced by a base station in the mobile communication network may vary from hundreds of square meters (in densely populated areas) to several square miles (in sparsely populated areas). Throughout this document, the terms "location" and "cellular zone" may be used interchangeably and refer to the area serviced by a particular base station. Further, the terms "base station" and "cellular zone" may be used interchangeably depending on the context. Further as shown in FIG. 1B, the user A (202a) may access the CDSN (110) at a time point in the cellular zone (203.11) via the base station A (111a) and move to the cellular zone (203.31) at another time point. The user N (202n) may be stationary in the cellular zone (203.14). Throughout this document, the terms "user", "mobile user", "subscriber user" may be used interchangeably and refer to a user of the CDSN (110) and a mobile device (e.g., mobile device A (114a)) instead of a system user of the user system (140). Specifically, a user of the system (140) is referred to as "system user" instead of "user" unless explicitly stated otherwise.

Returning to the discussion of FIG. 1A, in one or more embodiments of the invention, the correlation tool (120) is configured to interact with the CDSN (110) using one or more of the application interface(s) (121). The application interface (121) may be configured to receive data (e.g., network traffic data, not shown) from the CDSN (110) and/or store received data to the storage repository (127). Such network data captured over a time period (e.g., an hour, a day, a week, etc.) is referred to as trace or network trace. For example, the network trace may be captured on a routine basis using the data collector (114) and selectively sent to the application interface (121) from time to time to be formatted and stored in the repository (127) as the network trace (128) for analysis.

For example, the data collector (114) may include a packet analyzer, network analyze, protocol analyzer, sniffer, or other types of data collection device that intercept and log data traffic passing over the CDSN (110) or a portion thereof. In one or more embodiments, the data collector (114) or a portion thereof may be embedded within the accounting server (112). In one or more embodiments, the data collector (114) may be deployed in the CDSN (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the CDSN (110) or activated manually through the user system (140). In one or more embodiments, the data collector (114) is configured and/or activated by the correlation tool (120).

In addition, the application interface (121) may be configured to receive data (e.g., user mobility patterns (131), application categories (132), association table (133), etc.) from the storage repository (127) and deliver the data to the location based service server (115) and/or the user system (140).

In one or more embodiments of the invention, the location based service server (115) may use data (e.g., user mobility patterns (131), application categories (132), association table (133), etc.) received from the correlation tool (120) to configure the location based services provided to users (e.g., using the mobile device A (114a), mobile device N (114n), etc.) of the CDSN (110).

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) is configured to interact with a system user using the user interface (142). The user interface (142) may be configured to receive data and/or instruction(s) from the user. The user interface (142) may also be configured to deliver instruction(s) to the system user. In addition, the user interface (142) may be configured to send data and/or instruction(s) to, and receive data and/or instruction(s) from, the correlation tool (120). The system user may include, but is not limited to, an individual, a group, an organization, or some other legal entity having authority and/or responsibility to access the correlation tool (120). The context of the term "system user" here is distinct from that of a subscriber user of the CDSN (110) using the mobile devices (e.g., the mobile device A (114a), mobile device N (114n), etc.). Throughout this disclosure, the term "user" refers to the subscriber user of the CDSN (110) unless explicitly stated otherwise.

In one or more embodiments, the user system (140) may be, or may contain a form of, an internet-based communication device that is capable of communicating with the application interface (121) of the correlation tool (120). The user system (140) may correspond to, but is not limited to, a workstation, a desktop computer, a laptop computer, or other user computing device. In one or more embodiments, the correlation tool (120) may be part of the user system (140). In one or more embodiments, the correlation tool (120) may be part of the accounting server (112). In one or more embodiments, the correlation tool (120) may be part of the location based service server (115).

In one or more embodiments, the user system (140) may include a display unit (143). The display unit (143) may be a two dimensional (2D) or a three dimensional (3D) display configured to display information regarding the CDSN (e.g., browsing the network trace (128)) or to display intermediate and/or final results of the statistical trace analyzer (122) (e.g., user mobility patterns (131), application categories (132), association table (133), etc.).

As shown, communication links are provided between the correlation tool (120), the CDSN (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless.

In one or more embodiments, a central processing unit (CPU, not shown) of the correlation tool (120) is configured to execute instructions to operate the components of the correlation tool (120) (e.g., storage repository (127), the application interface (121), and the statistical trace analyzer (122)). In one or more embodiments, the memory (not shown) of the correlation tool (120) is configured to store software instructions for analyzing the network trace (128) to generate various intermediate and final results (e.g., user mobility patterns (131), application categories (132), association table (133), etc.). The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the correlation tool (120) is configured to obtain and store data in the storage repository (127). In one or more embodiments, the storage repository (127) is a persistent storage device (or set of devices) and is configured to receive data from the CDSN (110) using the application interface (121). The storage repository (127) is also configured to deliver working data to, and receive working data from, the statistical trace analyzer (122). The storage repository (127) may be a data store (e.g., a database, a file system, one or more data structures configured in a memory, some other medium for storing data, or any suitable combination thereof), which may include information (e.g., historical data, user information, base station information, etc.) related to associating the user mobility patterns and application categories. The storage repository (127) may be a device internal to the correlation tool (120). Alternatively, the storage repository (127) may be an external storage device operatively connected to the correlation tool (120).

In one or more embodiments, the correlation tool (120) is configured to interact with the user system (140) using the application interface (121). The application interface (121) may be configured to receive data and/or instruction(s) from the user system (140). The application interface (121) may also be configured to deliver instruction(s) to the user system (140). In addition, the application interface (121) may be configured to send data and/or instruction(s) to, and receive data and/or instruction(s) from, the storage repository (127), the statistical trace analyzer (122), and the CDSN (110).

In one or more embodiments, the data transferred between the application interface (121) and the CDSN (110) corresponds to user data and movement trajectory of the user mobile devices (e.g., mobile device A (114a), mobile device N (114n), etc.) and/or other information in the network trace (128). In one or more embodiments, the correlation tool (120) is configured to support various data formats provided by the CDSN (110) and/or the user system (140).

Generally speaking, the correlation tool (120) is configured to perform analysis of the network trace (128) using the statistical trace analyzer (122) to generate the association table (133). In one or more embodiments, entries of the association table (133) correlate the user mobility patterns (131) and the application categories (132). For example, an entry of the association table (133) may include a reference to one of the user mobility patterns (131) and another reference to one of the application categories (132). In one or more embodiments, the statistical trace analyzer (122) is configured to analyze the network trace (128) to identify the accounting data packets (129) and the application data packets (130) for further analysis to generate the user mobility patterns (131) and the association table (133). In particular, the accounting data packets (129) are generated by the accounting server (112) and include metering information of usage of the CDSN (110) by the subscriber users for transmitting the application data packets (130) contained in the network trace (128). More details of the accounting data packets (129), the application data packets (130), the user mobility patterns (131), the application categories (132), the association table (133), as well as functionalities of the statistical trace analyzer (122) are described in reference to an example of the network trace (128) and FIGS. 1C through 3E below.

In one or more embodiments, the accounting data packets (129), the application data packets (130), the user mobility patterns (131), the application categories (132), and the association table (133) may be arranged in various suitable formats and stored in a database, a file system, or one or more data structures configured in the repository (127). The correlation tool (120) may include one or more system computers, which may be implemented as a server or any conventional computing system However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the system (100), it will be appreciated that a variety of components with various functions may be used to provide the formatting, processing, utility and coordination functions necessary to modify various working sets/logs/data used by the correlation tool (120). The components may have combined functionalities and may be implemented as software, hardware, firmware, or combinations thereof.

The aforementioned example of the network trace (128) is collected from the content billing system for the data network of a large 3G mobile service provider as described below. Specifically, the content billing system is represented as the accounting server (112) while the data network is represented as the CDSN (110) described in reference to FIG. 1A above. The trace contains information about 281,394 clients in a large metropolitan area of 1,900 square miles (approx. 5,000 square kilometers) during a seven day period. The trace provides details of a packet data session defined as beginning from the time the user is authenticated based on the authentication, authorization and accounting (AAA) protocol by the Remote Authentication Dial in User Service (RADIUS) server of the 3G mobile network to the time the user logs off. For example, a user may be represented as the subscriber user of the mobile device A (114a) while the RADIUS server may be represented as the accounting server (112) or a portion thereof, described in reference to FIG. 1A above.

Separate from data packets associated with the AAA protocol, a user's packet data session may include Hypertext Transmission Protocol (HTTP) and/or Multimedia Messaging Service (MMS) sessions initiated by the user. Such HTTP and/or MMS sessions includes sessions consisting of application data packets Throughout this disclosure, the term "session" refers to the packet data session described here unless stated otherwise.

As illustrated in FIGS. 1A and 1B above, when the user A (202a) logs on to the CDSN (110) in the cellular zone (203.11), the serving Packet Data Serving Node (e.g., the base station A (111a) serving the cellular zone (203.11)) sends a RADIUS Access-Request to the RADIUS server (e.g., the accounting server (112)). If the user is successfully authenticated, the RADIUS server returns an Access-Accept message which contains a "correlation identifier" which will be used to uniquely identify the user through the entire packet data session.

Next, the Packet Data Serving Node uses the RADIUS accounting protocol (RADA) for communicating events to the RADIUS server. The events involve usage of CDSN (110) during the HTTP and/or MMS sessions. The RADIUS Access-Request, Access-Accept message, and other data packets associated with the AAA and/or RADA protocols are referred to as accounting messages consisting of accounting data packets. In one or more embodiments of the invention, the application data packets are extracted from the network trace (128) by the statistical trace analyzer (122) and stored in the repository (127) as the application data packets (129). Further, the accounting data packets are extracted from the network trace (128) by the statistical trace analyzer (122) and stored in the repository (127) as the accounting data packets (130).

These accounting messages (e.g., accounting data packets (129)) may contain the following relevant information: local timestamp, correlation identifier (e.g., correlating a pair of START and STOP messages), user identifier (e.g., phone number or email address), IP address assigned to the user, and the base station currently serving the user. These accounting messages can be of type Start, Update and Stop and there can be any number of these messages within a packet data session. Start messages are used to indicate the beginning of a new accounting activity, e.g., when the user starts a new application in the current packet data session. Update messages are generated periodically to indicate the current accounting status of the packet data session. The Stop message contains an attribute "Session Continue", which when set to "false" is indicative of the end of the packet data session. Changes in user's currently associated base station are reported either in an Update message or via a Stop message immediately followed by a Start message containing the new base station.

Each HTTP session contains the following details: IP address assigned to the user, the URL accessed and the local timestamp. Because the Multimedia Messaging Service (MMS) is run over HTTP in this example network, the example network trace provides the same records for MMS sessions as well.

In one or more embodiments, the statistical trace analyzer (122) is configured to analyze the network trace (128) to reconstruct a user's entire packet data session. An example is described as follows.

By analyzing the RADIUS and RADA messages (e.g., in the accounting data packets (129)), an association between a user identifier (e.g., phone number or email address) and currently assigned IP address is identified. Then, the applications accessed by a user are identified by grouping the HTTP and/or MMS sessions that occur after a RADIUS session and have the same IP address as the IP address assigned to the user in the RADIUS and RADA messages.

In one or more embodiments, the statistical trace analyzer (122) is configured to identify the location of a user in terms of the base station identifiers contained in the accounting data packets (129). In the example trace, there are a total of 1,196 base stations for the large metropolitan area. The area serviced by a base station in this network varies from hundreds of square meters (in densely populated areas) to several square miles (in sparsely populated areas). On average, a base station services 4 square kilometers. In the seven-day long example network trace, 3,162,818 packet data sessions are identified as generated by 281,394 users. Table 1 provides representative statistics for this example trace.

TABLE 1

Trace statistics

|  | Mean | 90% ile | Max. |
| --- | --- | --- | --- |
| Session duration | 40 min | 60 min | 3 days 20 hrs |
| Number of sessions per user | 11.2 | 24 | 4,442 |
| Number of unique base stations per user | 4.2 | 8 | 128 |

Figure 1C:
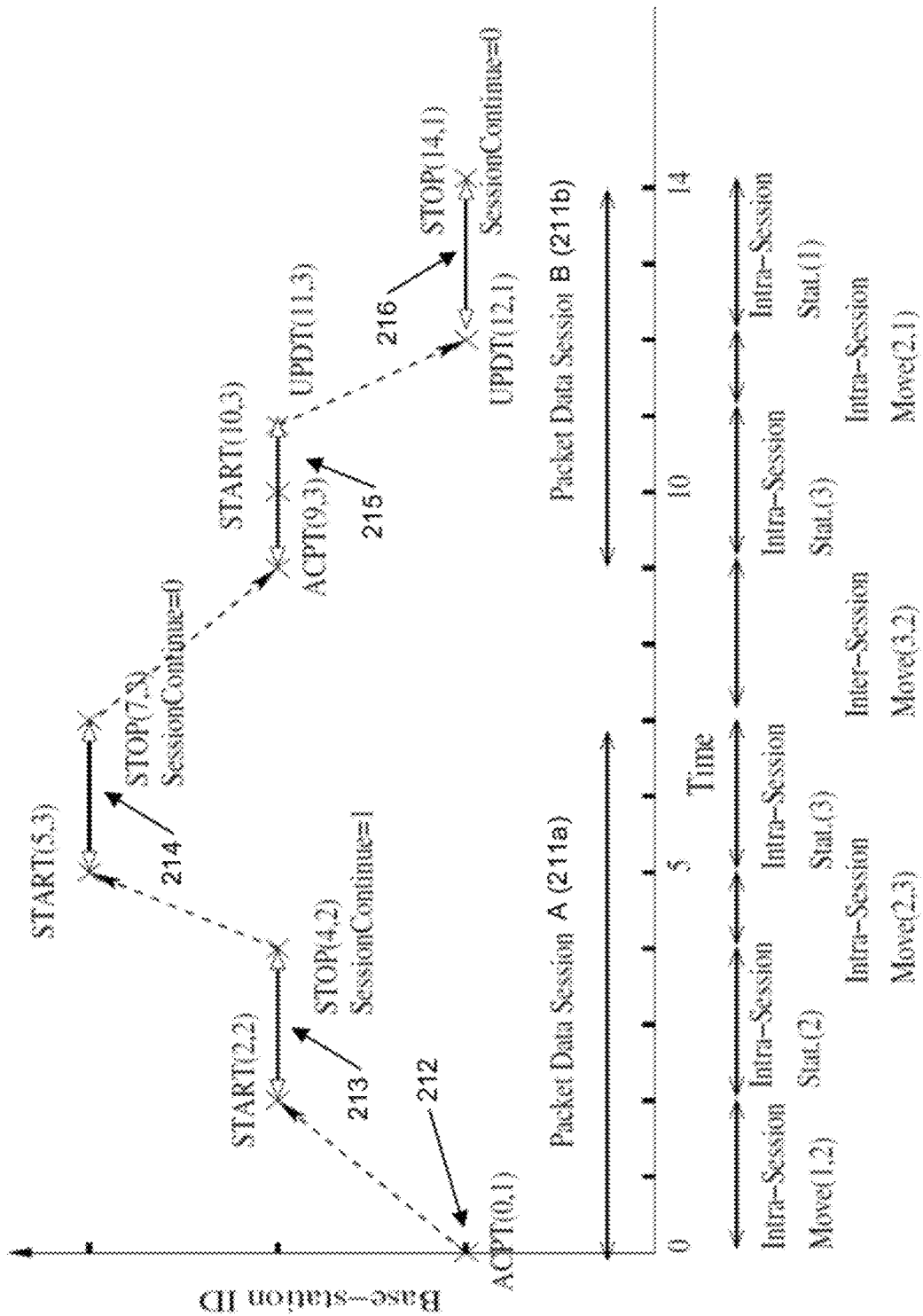
FIG. 1C shows a schematic diagram of an example sequence of locations of a user of the CDSN according to aspects of the invention.

FIG. 1C shows a schematic diagram of an example sequence of locations of a user of the CDSN (110) according to aspects of the invention. As shown in FIG. 1C, the horizontal access represents time (i.e., from time point 0 through time point 14) while the vertical axis represents base station identifiers (i.e., base station ID=1, 2, and 3). Further as shown, the example sequence of locations involves two different packet data sessions, namely packet data session A (211a) and packet data session B (211b). The packet data session A (211a) corresponds to a time period from time point 0 through time point 7 while the session B (211b) corresponds to a time period from time point 9 through time point 14. In the example of FIG. 1C, the packet data session A (211a) and the packet data session B (211b) are associated with the RADIUS accounting data packets of type Accept (e.g., Access-accept message, denoted as ACPT), Start, Update (denoted as UPDT), and Stop. In one or more embodiments, these RADIUS accounting data packets are used to extract the sequence of user locations (corresponding to consecutive base station access of a user) and the timestamps at which the user was present at those locations.

As shown in FIG. 1C, each of the ACPT, Start, UPDT, and Stop accounting data packets is associated with a pair of parameters: (timestamp, base station identifier). For example, ACPT (0, 1) represents the ACPT message containing a timestamp 0 and base station identifier 1. Generally, a packet data session may include multiple base station connections.

As shown in FIG. 1C, the packet data session A (211a) is initiated based on ACPT (0, 1) at time point 0 via a base station with base station ID=1, which indicates the first base station connection (212). In addition, the packet data session A (211a) includes a second base station connection (213) to a base station with bases station ID=2 from time point 2 (i.e., connection starting time) to time point 4 (i.e., connection stopping time) as indicated by START (2, 2), and STOP (4, 2). Further, the packet data session A (211a) includes a third base station connection (214) to a base station with bases station ID=3 from time point 5 to time point 7 as indicated by START (5, 3), and STOP (7, 3).

Similarly, the packet data session B (211b) is initiated based on ACPT (9, 3) at time point 9 via the base station with base station ID=3, which indicates the fourth base station connection (215). The fourth base station connection (215) to the base station with base station ID=3 continues with START (10, 3) at time point 10 and ends with UPDT (11, 3) at time point 11. In addition, the packet data session B (211b) includes a fifth base station connection (216) to the base station with bases station ID=1 from time point 12 to time point 14 as indicated by UPDT (12, 1), and STOP (14, 1). Throughout this disclosure, depending on the context, the term "base station connection" may be used to refer to the action of the user (e.g., via user mobile device) connecting to the base station, the continuous time period of uninterrupted connection to the base station, or a data structure representing such connection action and/or connection time period.

Although not explicitly shown in FIG. 1C, the accounting data packets associated with each of the aforementioned base station connections may be identified/grouped based on correlation identifiers contained in them. In one or more embodiments of the invention, base station connections, when present, for all users to all base stations are identified from the accounting data packets (e.g., the accounting data packets (129) of FIG. 1A) of a network trace (e.g., the network trace (128) of FIG. 1A) by analyzing one or more of timestamps, correlation identifiers, user identifiers, and base station identifiers contained in the accounting data packets. In one or more embodiments, each of the identified base station connections is represented as a data item that includes a connection timestamp (e.g., one or more of connection starting timestamp, connection stopping timestamp, or combinations thereof), a user identifier, and a base station identifier. In one or more embodiments, the data item further includes links to associated accounting data packets from which the base station connection is identified. In one or more embodiments, the statistical trace analyzer (122) is configured to analyze the network trace (128) and generate such data items therefrom as the base station connections. The identified base station connections (i.e., the data items generated by the statistical trace analyzer (122)) may then be stored, for example as the base station connections (134) in repository (127) of FIG. 1A above.

Generally, two base station connections having the same user identifier but different base station identifiers are associated with a user movement from a cellular zone of the base station connection with an earlier timestamp (referred to as the leading base station connection) to another cellular zone of a different base station connection with a later timestamp (referred to as the trailing base station connection).

Generally, there can be two kinds of movement events (i.e., user movements). Intra-session movement happens when the user's location changes within a packet data session due to hand-offs, such as Intra-Session Move (1, 2) between (Accept, 0, 1) and (Start, 2, 2) and Intra-Session Move (2, 3) between STOP (4, 2) and START (5, 3) within the packet data session A (211a) as well, as Intra-Session Move (2, 1) between START (10, 3) and UPDT (12, 1) within the packet data session B (211b). Inter-session movement, such as Inter-Session Move (3, 2), happens when the location changes during the inactive time, i.e., when the user is not active in the mobile network during a gap between two consecutive packet data sessions, e.g., between (Stop, 7, 3) of the packet data session A (211a) and (Accept, 9, 3) of the packet data session B (211b). As illustrated above, each movement is associated with a pair of parameters: (source base station identifier, target base station identifier). For example, Intra-Session Move (1, 2) represents the user moving from base station with identifier 1 to another base station with identifier 2. In particular, the base station where the user moves from is referred to as the source base station while the base station the user is moving to is referred to as the target base station.

In one or more embodiments, a movement event (e.g., Intra-Session Move (1, 2), Intra-Session Move (2, 3), Inter-Session Move (3, 2), and Intra-Session Move (2, 1)) of the user is identified and determined based on timestamps, user identifiers, and based station identifiers in the base station connections (134). In one or more embodiments, the statistical trace analyzer (122) is configured to analyze the base station connections (134) to identify base station connection pairs (i.e., the aforementioned leading and trailing base station connections) in the base station connections (134) as user movement events. In one or more embodiments, each of the identified user movement events is represented as a data item that includes information of the leading and trailing base station connections. For example, the data item may include links to the leading and trailing base station connections in the base station connections (134) and is generated by the statistical trace analyzer (122).

A user is considered to be stationary if the base station the user is associated with does not change over a period of time (e.g., a pre-determined limit or threshold), even if the user did physically move within the cellular zone serviced by the base station. Generally, there can be two kinds of stationary events for a user: intra-session stationary when a user's location stays the same within a packet data session (e.g., Intra-Session Stat. (2), Intra-Session Stat. (3), and Intra-Session Stat. (1)) and inter-session stationary when a user's location remains the same between two consecutive packet data sessions. Generally, each stationary event is associated with a base station identifier identifying the base station servicing the cellular zone within which the user remains. In one or more embodiments, a stationarity event (e.g., Intra-Session Stat. (2), Intra-Session Stat. (3), and Intra-Session Stat. (1)) of the user is identified and determined based on a base station connection having a duration exceeding a pre-determined threshold. In one or more embodiments, the statistical trace analyzer (122) is configured to analyze timestamps, user identifiers, and based station identifiers in the base station connections (134) to identify those base station connections having a duration exceeding the pre-determined threshold as user stationarity events. In one or more embodiments, each of the identified user stationarity events, is represented as a data item that includes information of the associated base station connection. For example, the data item may include a link to the associated base station connection in the base station connections (134) and is generated by the statistical trace analyzer (122).

A user is considered to disappear if the user switched off the user mobile device and is not connected to any base station over a period of time (e.g., a pre-determined limit or threshold). Generally, each disappearance event is associated with a base station identifier identifying the base station to which the user was last seen as connected. In one or more embodiments, a disappearance event of the user is identified and determined based on a base station connection followed by a user disconnection having a duration exceeding a pre-determined threshold. In one or more embodiments, the statistical trace analyzer (122) is configured to analyze timestamps, user identifiers, and based station identifiers in the base station connections (134) to identify those base station connections followed by a disconnected duration exceeding the pre-determined threshold as user disappearance events. In one or more embodiments, each of the identified user disappearance events is represented as a data item that includes information of the associated base station connection. For example, the data item may include a link to the associated base station connection in the base station connections (134) and is generated by the statistical trace analyzer (122).

The identified movement events, stationarity events, and disappearance events (i.e., the data items generated by the statistical trace analyzer (122)) are referred to as user mobility events and may then be stored, for example as user mobility events (135) in repository (127) of FIG. 1A above.

In one or more embodiments, the statistical trace analyzer (122) is further configured to determine a user mobility pattern representing a statistical pattern of user mobility events (as well as underlying base station connections of the users correlated in time, of multiple (e.g., a hundred, a thousand, etc.) users using the CDSN. In one or more embodiments of the invention, the analysis is based on association rule mining techniques. In one or more embodiments, each of the user mobility patterns is represented as a data item that includes information of the associated user mobility events (i.e., movement events, stationarity events, and disappearance events). For example, the data item may include a link to the associated user mobility events in the user mobility events (135) and is generated by the statistical trace analyzer (122). In one or more embodiments, links between the user mobility pattern, associated user mobility events, associated base station connections, and associated accounting data packets may be stored in other suitable data structures. More details of determining user mobility patterns (131) are described in reference to FIGS. 2A-3E below.

In one or more embodiments, the statistical trace analyzer (122) is further configured to determine a user's application affiliation (e.g., based on interest) by classifying the URL visited by the user. In one or more embodiments, the URLs accessed by users are classified into application categories via keyword mining over the URL. In one or more embodiments, the application categories may be pre-determined and include dating, gaming, mail, maps, MMS, music, news, photo, ringtones, search, social networking, trading, travel, video, weather, etc.

An example list of the classification rules is provided in Table 2.

TABLE 2

Classifying URLs into Interests

| Interest | Keywords |
| --- | --- |
| Dating | dating, harmony, personals, single, match |
| Music[3] | song, mp3, audio, music, track, pandora |

TABLE 2-continued

Classifying URLs into Interests

| | |
|---|---|
| News | magazine, tribune, news, journal, times |
| Trading | amazon, ebay, buy, market, craigslist |
| Social netw. | facebook, myspace, blog |

| Interest | Keywords | Interest | Keywords |
|---|---|---|---|
| Gaming | poker, blackjack, game, casino | Mail | mail |
| Maps | virtualearth, maps | MMS | nuns |
| Photo | gallery, picture, photo, flickr | Ringtones | tones |
| Search | google, yahoo, msn | Weather | weather |
| Travel | vacation, hotel, expedia, travel | Video | video |

In one or more embodiments, the statistical trace analyzer (122) is configured to associate a user's application affiliation to the user's location based on base station identifiers. Specifically, when a URL accessed by the user is detected in an application data packet, the timestamp and assigned IP address contained in the application data packet are compared and correlated with those contained in accounting data packets, which contain the base station identifier of the cellular zone that the user is in. Said in other words, each of these application accesses are then associated with corresponding packet data session by comparing the timestamp of the application data packet containing the URL and the timestamps of the accounting packages indicating times at which the user logged on and off from the CDSN (110). In one or more embodiments, the statistical trace analyzer (122) is configured to associate a user mobility pattern (e.g., one or more pattern in the user mobility patterns (131)) identified from the CDSN network trace (e.g., network trace (128)) with one or more of the application categories. More details of associating user mobility patterns with application categories are described in reference to FIGS. 2A-3E below.

Figure 2A:
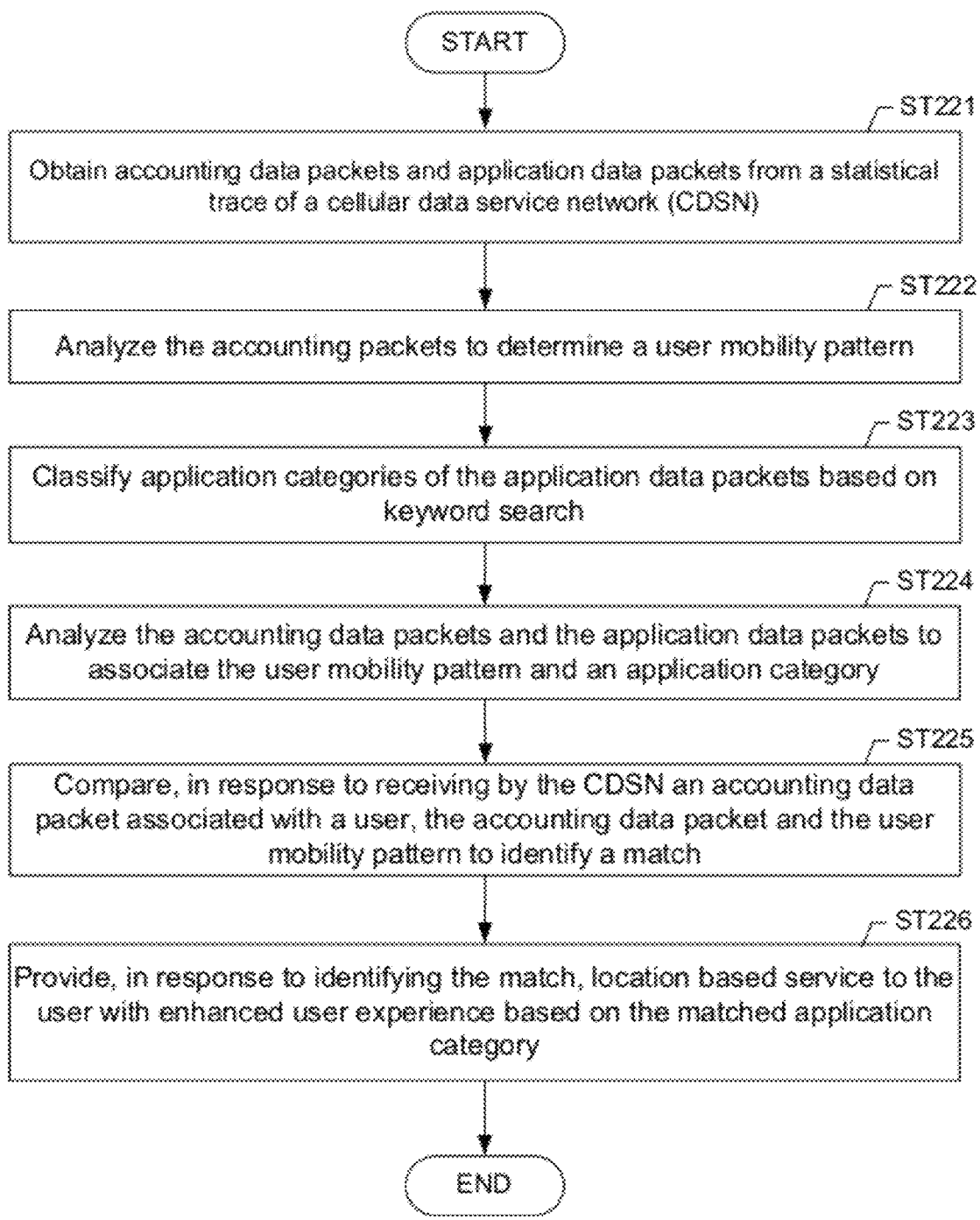
FIGS. 2A and 2B show method flow charts according to aspects of the invention.
Figure 2B:
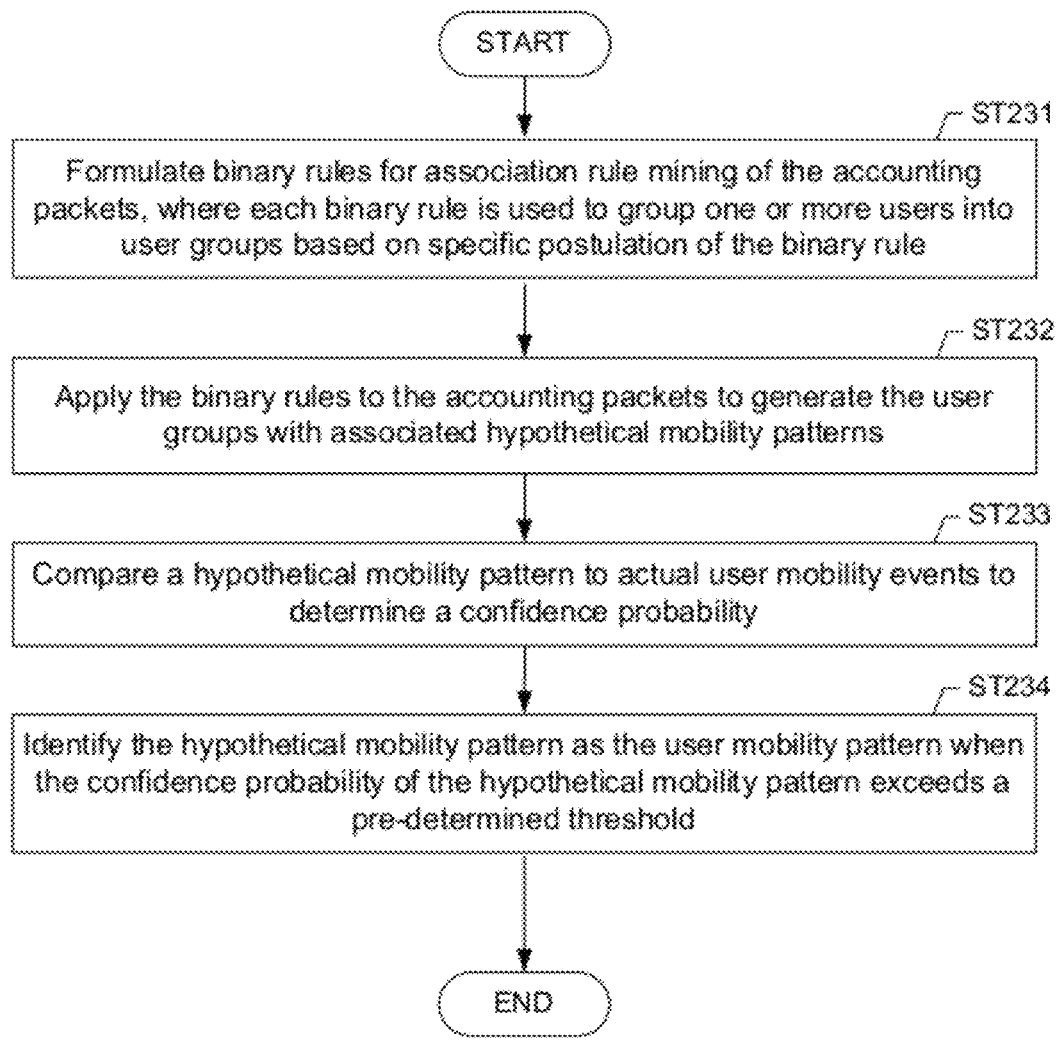

FIGS. 2A and 2B depict method flowcharts of methods in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2A and 2B may be practiced using system (100) described with respect to FIG. 1A above.

As shown in FIG. 2A, initially in Step 221, accounting data packets and application data packets are obtained from a cellular data service network (CDSN). For example, the CDSN may be that described in reference to FIG. 1A above where accounting data packets include metering information of CDSN usage by subscriber users for transmitting the application data packets. In one or more embodiments, the accounting data packets and application data packets are extracted from a network trace based on known formats of these data packets. For example, the network trace may be the aforementioned network trace collected from the content billing system for the data network of a large 3G mobile service provider. In this example, the accounting data packets may correspond to RADIUS and RADA protocols while the application data packets may correspond to HTTP and MMS sessions. In one or more embodiments, the network trace may be obtained on a periodic basis (e.g., hourly, daily, weekly, etc.) or based on a trigger. For example, the trigger may be activated automatically in response to an event in the CDSN or activated manually through a third party system. Further, the network trace may be obtained from an ISP (information service provider) operating the CDSN or captured directly by a third party operating the third party system. For example, Steps 222 through 224 described below may be performed by the third party system while Steps 225 and 226 described below may be performed by a location based service (LBS) server providing LBS to the users via the CDSN. In one or more embodiments, such third party system and LBS server may be operated by the same entity. In one or more embodiments, such third party system and LBS server may be operated by different entities. In one or more embodiments, one or both of the third party system and LBS server may be operated by the ISP operating the CDSN.

In Step 222, the accounting data packets are analyzed to determine a user mobility pattern representing a statistical pattern of user mobility events, correlated in time, of multiple (e.g., a hundred, a thousand, etc.) users using the CDSN. In one or more embodiments of the invention, a statistical pattern is said to exist in the user mobility events (as well as the underlying base station connections of the users) if multiple users identified from the network trace did move from a source location to a target location in a manner satisfying a pre-determined timing condition. For example, the pre-determined timing condition may require user movement events of multiple users in the statistical pattern to be associated with base station connections where the leading base station connection is associated with an accounting data packet containing a timestamp (referred to as leading timestamp) within a time window with pre-determined start time and time period while the trailing base station connection is associated with another accounting data packet containing a timestamp (referred to as trailing timestamp) within a pre-determined time duration from the leading timestamp.

In one or more embodiments of the invention, the analysis of the accounting data packets for determining user mobility pattern is based on association rule mining techniques described in FIG. 2B that includes the steps of (a) Step 321: formulating a set of binary rules for association rule mining of the accounting data packets, where each binary rule is used to group one or more users into user groups based on specific proposition of the binary rule, where each user group is associated with a hypothetical mobility pattern of the included users; (b) Step 232: applying the binary rules to the accounting data packets to generate the user groups with the associated hypothetical mobility patterns; (c) Step 233: comparing a hypothetical mobility pattern to actual user mobility events to determine a confidence probability of the hypothetical mobility pattern; and (d) Step 234: including the hypothetical mobility pattern in the user mobility patterns when the confidence probability of the hypothetical mobility pattern exceeds a pre-determined threshold.

In one or more embodiments, the analysis of the accounting data packets for determining user mobility pattern is based on association rule mining techniques and uses binary rules to group movement events and stationarity events that are identified/extracted from the accounting data packets. Specifically, the proposition of the binary rule is formulated in the form of one antecedent and one consequent. Generally, the antecedent is the conditional element in the proposition. Said in other words, the proposition is true if the condition stated in the antecedent implies the condition stated in the consequent. Conversely, the proposition is false if the condition stated in the antecedent does not imply the condition stated in the consequent. In one or more embodiment, the antecedent states that a user is present at one location (referred to as the source location) while the consequent states that the user is present at another location (referred to as the target location). In one or more embodiments, the antecedent is in the form of a pair of a source base station identifier and a time window with pre-determined start time and time period. The consequent is in the form of a pair of a target base station identifier and a pre-determined time duration.

In one or more embodiments, the analysis of the accounting data packets for determining user mobility pattern is based on association rule mining techniques and uses binary rules to identify location boundaries (enclosing source location and target location) that become popular in a recurring manner, for example at certain times of day. Such location boundaries are referred to as a hotspot. Popularity in hotspots may be due to work commutes as well as locations frequented by a user (e.g., residential and work areas).

In one or more embodiments, a user who is accessing the CDSN from a certain location (or base-station) is modeled in a state transition model as having the following three possible exit states: (1) user moves to a new location either while staying connected via the same session (intra-session movement) or logs-off and logs back again via a new session (inter-session movement); (2) user stays at the same location (intra- or inter-session stationary) and; (3) user switches-off his mobile device (disappear) and does not re-appear for some time. Further, a user can be defined to have the following three entry states in the state transition model with respect to a location: (1) user appears in the location for the first time via a new session; (2) user stayed in the location from the past and; (3) user entered the location from a different location.

In one or more embodiments, the following three types of binary rules, each having an antecedent and a consequent forming a proposition, are formulated to group users with respect to their exit states. As noted above, a base station connection may be represented as a data item that includes one or more of a connection timestamp (e.g., one or more of connection starting timestamp, connection stopping timestamp, or combinations thereof), a user identifier, a base station identifier, and links to associated accounting data packets from which the base station connection is identified. The three types of binary rules are defined mathematically based on user base station connections as below.

Definition 1. Movement Rule:

Group all users $u_i$ from the user-set U who are present at location $x_i$, from where the user accessed the network via a session at time $t_i \in$ time window w and whose next location is $x_j \ne \theta$ either within the same session or via a new session before time $t_i + \delta$.

Given $\delta$, $\forall u_i \in$ U, obtain groups $(x_i, x_j \ne \theta, w, \delta)$ s.t. $\exists t_j \in (t_i, t_i + \delta]$: $x_i, t_i \in w \Longrightarrow x_j, t_j$.

Definition 2. Stationary Rule:

Group all users $u_i$ from the user-set U who are present at location $x_i$, from where the user accessed the network via a session at time $t_i \in$ window w and has since been present at the same location $x_i$ either via the same session or a new session, since time $t_i$ up until the time $t_i + \delta$.

Given $\delta$, $\forall u_i \in$ U, obtain groups $(x_i, x_i, w, \delta)$ s.t. $\forall t_j \in (t_i, t_i + \delta]$: $x_i, t_i, \in w \Longrightarrow x_i, t_j$.

Definition 3. Disappear Rule:

Group users who were present at location $x_i$ at time $t_i \in$ window w and who since then have switched-off their device up until $t_i + \delta$ seconds.

Given $\delta$, $\forall u_i \in$ U, obtain groups $(x_i, \theta, w, \delta)$ s.t. $\forall t_j \in (t_i, t_i + \delta]$: $x_i, t_i \in w \Longrightarrow \theta, t_j$.

Considering the binary rules described above, each proposition may be true or false (hence binary) for a specific user based on the aforementioned timing condition defined by the selected values of $t_i$, w, and $\delta$. Further, each proposition with specific timing condition (i.e., specific values of $t_i$, w, and $\delta$) and base station(s) is referred to as a hypothetical user mobility pattern. Conversely, the hypothetical user mobility pattern is said to be associated with the antecedent and consequence with the specific timing condition (i.e., specific values of $t_i$, w, and $\delta$) and base station(s). Accordingly, the total number of hypothetical user mobility patterns of the movement rule type, stationary rule type, and disappear rule type can be up to X*X*T, X*T, and X*T, respectively for a network trace where X and T represents total numbers of base stations and time windows, respectively, found in the network trace. Further, the number of each type of such hypothetical user mobility patterns may vary depending on the selected values of w and $\delta$ in the aforementioned timing condition. In analyzing the aforementioned example network trace, example time windows may be in one hour length hence the time window variable w takes values at the hourly boundaries of the time scale. An example value of $\delta$ may be 4 hours.

In one or more embodiments, the time window variable w is associated with an attribute identifying the time window as a particular component of a recurring time sequence. For example, the attribute may identify the time window as a particular hour in a day, a particular day in a week, month, or year, etc. In particular, for the aforementioned 7 day long network trace having 168 (i.e., 24*7) time windows each one hour in length, each time window may have an attribute (e.g., a tag) indicating the hour of the day, day in the week of the particular time window. For example, the first time window in the 168 time windows may have a tag indicating that it starts at 5:00 pm on a Monday, while the 25$^{th}$ time window in the 168 time windows may have a tag indicating that it starts at 5:00 pm on a Tuesday. In one or more embodiments, a set of hypothetical user mobility patterns with the same base station(s) are categorized into daily patterns, weekly patterns, monthly patterns, yearly patterns, etc. based on the attribute of the time window in the timing condition of the corresponding proposition. For example as depicted in FIG. 1C above, hypothetical user mobility patterns having selected values of base station consistent with the Intra-Session Move (2,3) and selected value of time window variable w with "5:00 pm" attribute (i.e., a hour of day tag of "5:00 pm") are collectively referred to as a daily pattern that occurs at 5:00 pm. Similarly, hypothetical user mobility patterns having selected values of base station consistent with the Intra-Session Move (2,3) and selected value of time window variable w with "Monday" attribute (i.e., a day of week tag of "Monday") are collectively referred to as a weekly pattern that occurs on Monday. Moreover, those hypothetical user mobility patterns collectively referred to as a weekly pattern may be further grouped into sub-patterns based on their hour of day tags.

In one or more embodiments, support for a hypothetical user mobility pattern is defined as the number of users that follow the antecedent (i.e., that were present at location $x_i$ within the time window w) while confidence for the hypothetical user mobility pattern is defined as the number of users who follow the binary rule (e.g., for the movement rules, those who move from location $x_i$ to location $x_j$). In one or more embodiments, confidence for a hypothetical user mobility pattern associated with a movement rule is a function of the source location $x_i$, target location $x_j$, time window w, and time delay $\delta$ and is represented as conf($x_i, x_j, w, \delta$). Similarly, confidence for a hypothetical user mobility pattern associated with a stationary rule is a function of the location $x_i$, time window w, and time delay $\delta$ and is represented as conf($x_i, x_i, w, \delta$). Similarly, confidence for a hypothetical user mobility pattern associated with a disappearance rule is a function of the location $x_i$, time window w, and time delay $\delta$ and is represented as conf($x_i, 0, w, \delta$).

In one or more embodiments, each of the user mobility events (135) stored in the repository (127) of the user mobility pattern and application category tool (120) may be analyzed by the statistical trace analyzer (122) to find out how many user mobility events match the hypothetical user mobility pattern thereby determining the number of users who follow the binary rule. In one or more embodiments, a user mobility event is said to match the hypothetical user mobility pattern if (1) base station(s) of the user mobility event matches base station(s) of the hypothetical user mobility pattern and (2) timestamp(s) of the user mobility event satisfies the timing condition of the hypothetical user mobility pattern.

Further, confidence probability for a hypothetical user mobility pattern is defined as the probability that users who have followed the binary rule antecedent will also follow the consequent as well. Said in other words, confidence probability for a hypothetical user mobility pattern is the probability that the corresponding proposition is true for the users. In one or more embodiments, the confidence probability is calculated as confidence divided by support. In one or more embodiments, confidence probability may be weighted and normalized by the values of the support. As described above, when the confidence probability of a hypothetical user mobility pattern exceeds a pre-determined threshold, the hypothetical user mobility pattern is referred to as a user mobility pattern and included as one of the user mobility patterns (131) stored in the repository (127) of the user mobility pattern and application category tool (120). Accordingly, user mobility patterns are categorized into daily patterns, weekly patterns, monthly patterns, yearly patterns, etc. based on the corresponding hypothetical user mobility patterns having confidence probability exceeding the pre-determined threshold.

In Step 223, each of the application data packets is classified as belonging to one or more of a number of pre-determined application categories based on keyword search. In one or more embodiments, URL of each of the application data packets in the network trace is analyzed to identify application categories via keyword mining. In one or more embodiments, the application categories may be pre-determined and include dating, gaming, mail, maps, MMS, music, news, photo, ringtones, search, social networking, trading, travel, video, weather, etc. As noted above, an example list of the classification rules is provided in Table 2 above. In one or more embodiments, each of the pre-determined application categories may be represented as a data item containing links to the application data packets belonging therein. For example, each of the pre-determined application categories may be represented as an entry in the application categories (132) stored in the repository (127) of the user mobility pattern and application category correlation tool (120) described in reference to FIG. 1A above. In one or more embodiments, each of the application data packets may be represented as a data item containing links to the associated pre-determined application. For example, each of the application data packets may be represented as an entry in the application data packets (130) stored in the repository (127) of the user mobility pattern and application category correlation tool (120) described in reference to FIG. 1A above. In one or more embodiments, links between an application data packet and the associated pre-determined application category may be stored in other suitable data structures.

In Step 224, the accounting data packets and the application data packets are analyzed based on network addresses and timestamps to associate the user mobility patterns and pre-determined application categories. In one or more embodiments, an accounting data packet and an application data packet in the network trace is associated based on (1) a comparison of a first timestamp contained in the accounting data packet and a second timestamp contained in the application data packet, for example as illustrated in FIG. 1C, the application data packet is required to have a timestamp consistent with START and/or STOP timestamp(s) of the accounting data packet, (2) the accounting data packet and the application data packet both include a same network address assigned to a connection session for connecting a user to the CDSN, and (3) the accounting data packet includes a user identifier identifying the user. As described in reference to FIG. 1A above, in one or more embodiments, the user mobility pattern, associated user mobility events, associated base station connections, and associated accounting data packets may be linked using suitable data structures. In one or more embodiments, a user mobility pattern is associated with accounting data packets based on such data structures, and in turn associated with application data packets as described above, and further in turn associated with a pre-determined application category as described in Step 223 above.

In Step 225, when an accounting data packet associated with a particular user is received by the CDSN, it is compared to the user mobility pattern to identify a match.

In one or more embodiments, the match is identified if the newly received accounting data packet includes timestamp and base station information consistent with the user mobility pattern. For example, a match is identified if the timestamp of the newly received accounting data packet and the timing condition, or a portion thereof, of the previously determined user mobility pattern correspond to a same time window in a day, same time window in a week, or same time window in other recurring time periods (e.g., a month, a year, etc.). Accordingly, the newly received accounting data packet may be matched to a daily pattern, weekly pattern, monthly pattern, yearly pattern, or other recurring patterns.

In one or more embodiments, the match is identified if a user mobility event associated with the newly received accounting data packet includes timestamp and base station information consistent with the user mobility pattern. For example, a match is identified if the timestamp of the user mobility event and the timing condition, or a portion thereof, of the previously determined user mobility pattern correspond to a same time window in a day, same time window in a week, or same time window in other recurring time periods (e.g., a month, a year, etc.). Accordingly, the user mobility event associated with the newly received accounting data packet may be matched to a daily pattern, weekly pattern, monthly pattern, yearly pattern, or other recurring patterns.

In Step 226, when an accounting data packet associated with a particular user is received by the CDSN, location based service associated with a pre-determined application category associated with the user mobility pattern that is matched by the newly received user accounting data packet is provided to this particular user with enhanced user experience (e.g., speed improvement via information caching for the particular LBS, selective quality of service enhancement for the particular LBS, etc.). Examples of matching user mobility pattern and newly received accounting data packet to provide LBS with enhanced user experience are described in reference to FIGS. 3A to 3E below.

Figure 3A:
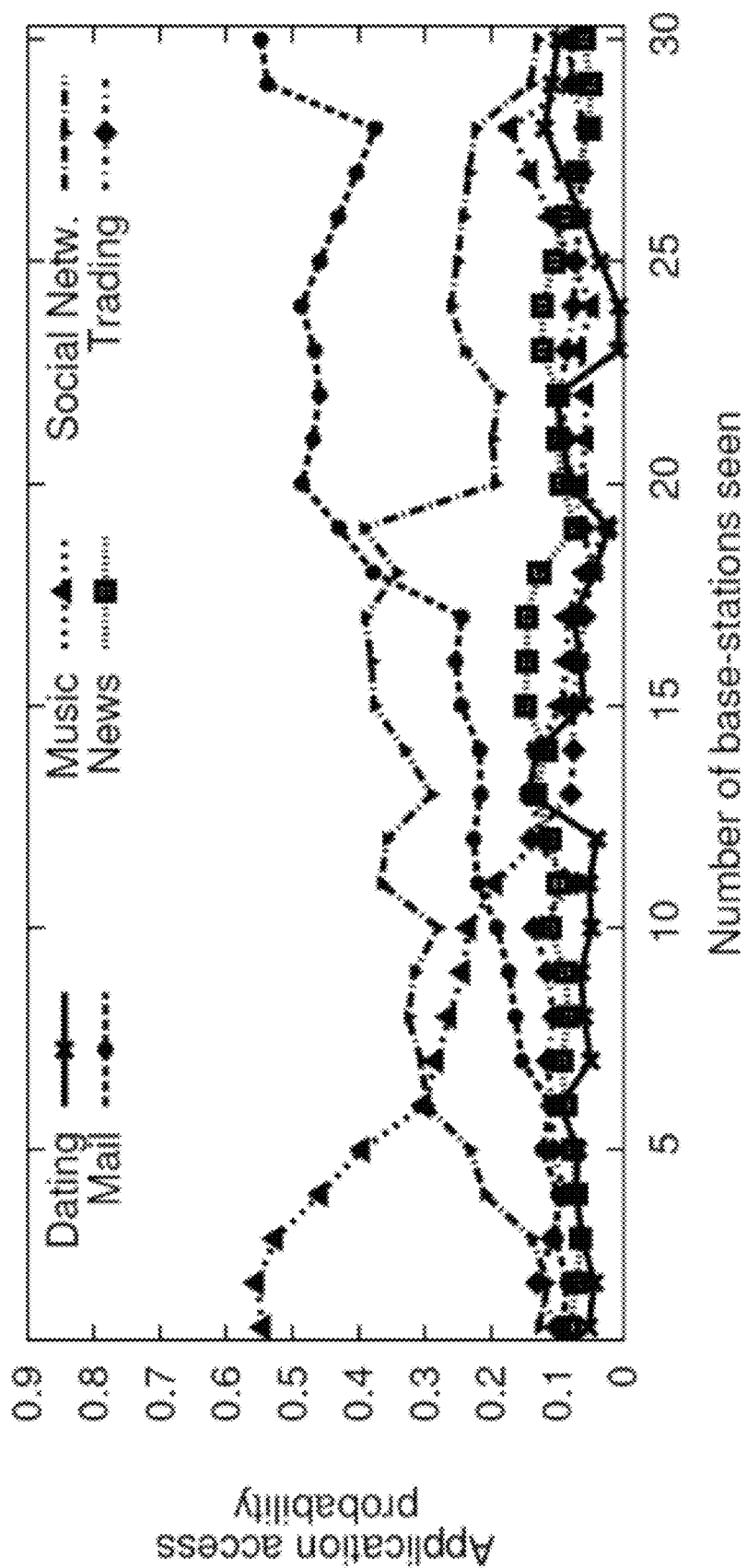
FIGS. 3A-3E show an example according to aspects of the invention.

FIGS. 3A-3E show an example according to aspects of the invention. FIG. 3A illustrates how mobility span, i.e., the number of locations that a user visits, impact the applications he accesses. Specifically, FIG. 3A shows the application access probability as a function of discrete mobility spans based on the aforementioned example network trace. In particular, we explore groups of users that have been seen at that particular number of locations during the seven day period. For each of the points on x-axis, the sum of normalized access probabilities on y-axis equals to one. As shown in FIG. 3A, high correlation (and anti-correlation) exists between the mobility span and applications that user access.

In particular, for the "stationary" users (number of base-stations seen equals 1), music dominates. In contrast, e-mail shows completely opposite trend. Indeed, the more stationary users are, the less they access e-mail on their mobile devices. This is likely because they use other devices (e.g., a home computer) to access e-mail.

Further, the more user move, the more e-mail starts dominating the applications. Indeed, for those who have a large mobility span, e-mail is by far the most accessed application, more than 50% of time. This is likely because those who move a lot have their mobile phones as their primary communication devices.

Finally, social networking shows a different behavior. It lags far behind the leading applications both within highly stationary group (lags behind music) and within highly mobile group (lags behind e-mail). However, for the medium mobility span group, for which music starts to fade due to mobility, and e-mail still does not start to dominate fully, social networking is the leading application.

Figure 3B:
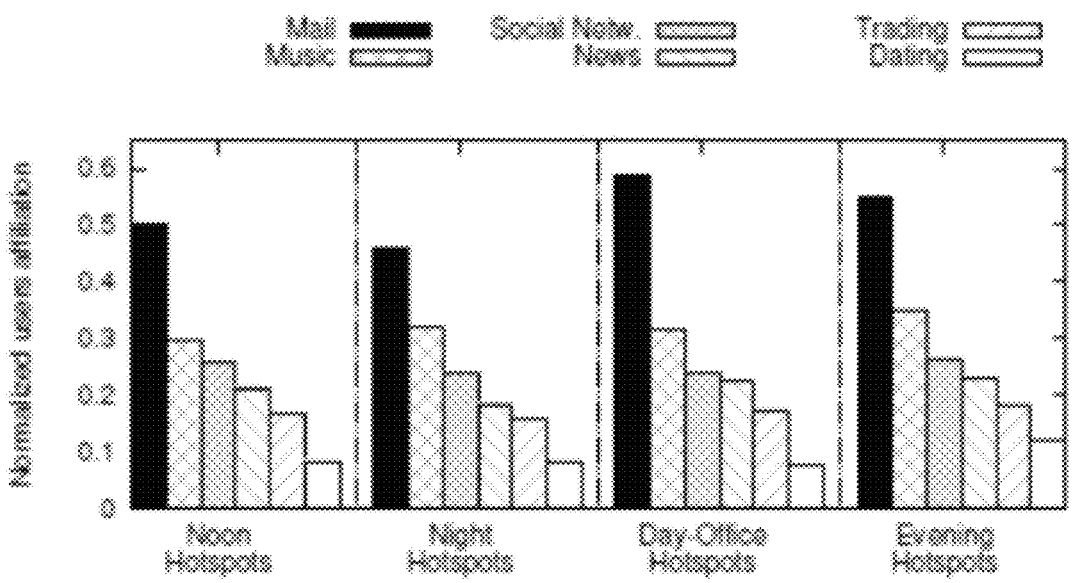

FIG. 3B shows the effects of user movements on locations and how locations evolve as a result. In one or more embodiments, locations having a high net change in user presence at a certain time window are identified as hotspots. Further, the interests of the users that are attracted to the hotspot as well as the actual applications that users access while they are present in the hotspots are identified. In one or more embodiments, the hotspots are identified based on the aforementioned binary rules. In an example, the selected values of w and δ are both set as one hour. Let x and h represent a location and an hour window (i.e., w with time window length of one hour), respectively. Let the number of users who first switched-on their mobile devices at location X in the hour window h be denoted as: $n_a(x,h)$. Next, let $n_d(x,h)$ denote the users who log-off from the network at location x in the hour window h. Finally, let those who entered the location x within the hour window h from some other location be denoted as $n_e(x,h)$, those that left the location x in that hour as $n_l(x,h)$ and those that continued staying in the location x for that hour as $n_s(x,h)$. The number of users entering a location x at a given hour h can be computed as the total confidence of all the movement rules which have this location as a target as follows:

$n_e(x,h) = \Sigma_{y\ neq\ x} \text{conf}(y,x,h,1)$ where "neq" represent "not equal to".

Next, the number of users leaving a location at a given hour can be computed as the total confidence of all the movement rules which have this location as the source as follows:

$(x,h) = \Sigma_{y\ neq\ x} \text{conf}(x,y,h,1)$.

Next, the number of users that stay stationary at a location at a given hour is given directly by the confidence of the stationary rule involving this location as follows:

$n_s(x,h) = \text{conf}(x,x,h,1)$.

Similarly, the users who first appear or finally disappear at a location at a given hour are given directly by the confidence of the appear and disappear rules respectively as:

$n_a(x,h) = \text{conf}(0,x,h,1)$ and $n_d(x,h) = \text{conf}(x,0,h,1)$.

For each location, the total number of users who were present in an hour window, N(x,h) can be described by considering all the exit states of those users, i.e., by counting all the users who disappeared, those who left for some other location and those who stayed stationary:

$N(x,h) = n_s(x,h) + n_l(x,h) + n_d(x,h)$.

Now, for the same location at the next hour window h+1, the total number of users is given by those who stayed back from the past window as well as those who first switched-on their devices at this location and those who moved from some place else:

$N(x,h+1) = n_s(x,h) + n_a(x,h+1) + n_e(x,h+1)$.

Thus, the net change in users at a location across two consecutive hour windows h and h+1 is composed of two components, a net inflow and net outflow and is obtained as inflow minus outflow or:

$N(x,h+1) - N(x,h) = \{n_a(x,h+1) + n_e(x,h+1)\} - \{n_l(x,h) + n_d(x,h)\}$.

Hence, a location is determined as a hotspot at a certain hour as follows.

When the net inflow at a location during a certain hour contributes to the total number of users at the location at that hour by more than a fraction $\gamma_{in}$, i.e., $\{n_e(x,h) + n_a(x,h)\}/N(x,h)$ geq $\gamma_{in}$ where "geq" represents greater than or equal to, then the location is determine as a sink.

Similarly, when the net outflow at a location during a certain hour contributes to the total number of users at the location at that hour by larger than a fraction $\gamma_{out}$, i.e., $\{nl(x,h) + nd(x,h)\}/N(x,h)$ geq $\gamma_{out}$, then the location is determined as a source.

Finally, when the number of users who stayed at a location within an hour, $n_s(x,h)$ contributes to the total number of users at the location at that hour by more than a fraction $\gamma_s$, the location is determined as a stationary location.

Note that a location could be both a source and a sink at the same hour in some cases, such as base-stations located next to freeways.

In an example, the values of thresholds are selected as the 90 percentile for each of the fractions $\gamma_{in}$, $\gamma_{out}$, and $\gamma_s$ across the entire trace duration. Thus, the threshold $\gamma_{in}$ is chosen as the 90 percentile of the fractional contribution of net inflow across all the base-stations over the entire trace and similarly, for the other two thresholds.

This yields values of $\gamma_{in}=0.7$, $\gamma_{out}=0.7$ and $\gamma_s=0.3$ based on the aforementioned example network trace. Accordingly, the hotspots are determined based on the sinks, sources, and stationary locations. Further, the hotspots may be analyzed by looking for most likely causes for their creation. In particular, publically available geographic information (e.g., downtown vs. suburb) and other properties (e.g., residential vs. business area) of given areas may be used in the analysis. For example, day hotspots are sinks during early morning (8 AM-10 AM), stationary locations during the day and become sources in early evening (6 PM-7 PM). They are dominated by user at work, who reside at their offices during business hours. Noon hotspots are sinks during the afternoon (12 AM-1 PM) and sources shortly after (2 PM-3 PM). They are dominated by user taking a noon (lunch) break. Evening hotspots are sinks during the evening (7 PM-8 PM) and sources shortly after (10 PM-11 PM). They are dominated by user going out in the evening. Night hotspots are sinks in early evening (6 PM-8 PM), stationary locations during the night, and become sources in the early morning (7 AM-9 AM). They are dominated by the user at their homes during night.

By applying the above analysis, 23 day hotspots, 28 noon hotspots, 8 evening hotspots, and 62 night hotspots are identified from the aforementioned example network trace. A majority (95%) of hotspots get classified by one label (i.e., day, noon, evening, or night) only.

As an example, analysis is performed to understand what online applications do user access at these locations. More precisely, the analysis is performed to identify general application affiliations do user who gather in these hotspots have, i.e., to identify the hotspots' user base and applications users access when they are present at hotspots.

In the example of analyzing the aforementioned example network trace, the user base of a hotspot (or any location) is defined as the breakdown in applications accessed by the users who were present at the hotspot, while considering all the applications that they have accessed during the seven day trace period, i.e., not limited to the applications they accessed while they were present at the hotspot.

FIG. 3B shows the results regarding hotspots' user base where the normalized user affiliation for given applications is plotted at different hotspots. For example, the figure for noon hotspots shows that 50% of users present at noon hotspots use e-mail (during the seven day interval, not necessarily in the given hotspot), 30% access music, etc. Because users can have more than one application affiliation, the sum of normalized affiliations does not equal to one. The key insight from FIG. 3B is that all hotspots have similar user base. The majority of users at these locations access e-mail on their mobile phones, and the least number of users engage in dating. Indeed, the trend over all locations (hotspots and non-hotspots) in the example network trace is the same (not shown). Hence, it appears that there is nothing specific about users who enter these hotspots relative to those who do not access them.

Figure 3C:
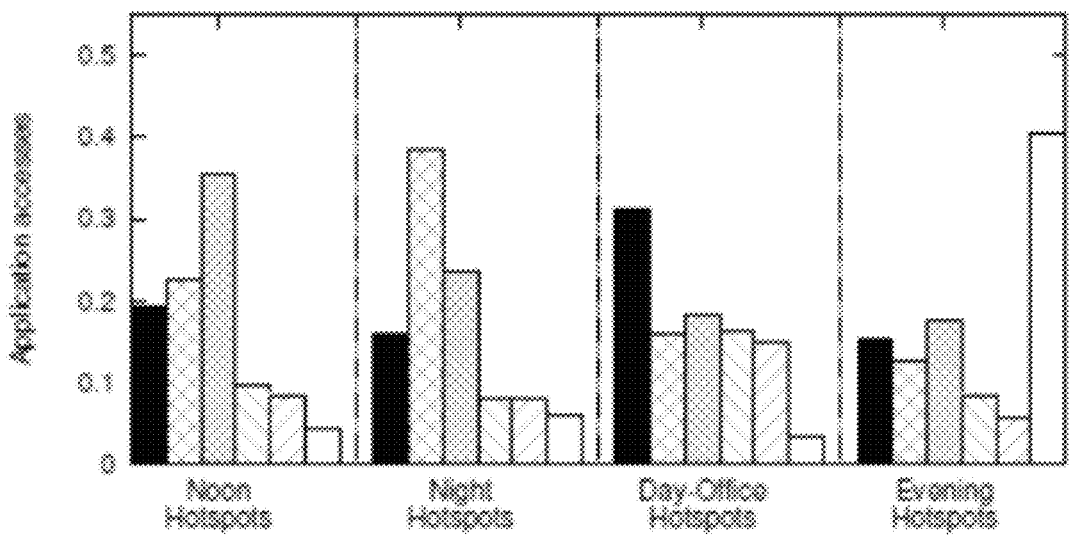

However, on considering the actual applications accessed at the hotspots, the observations are quite different. FIG. 3C shows that there is a strong correlation between the hotspot type and the primary application that users access at these hotspots. In other words, user with the same general application affiliations show highly skewed and biased group behavior towards a single application at the considered hotspots. In particular, social networking is the dominant application among those at noon hotspots; music among those at night hotspots; e-mail among those at office hotspots; and dating among those at evening hotspots. Thus, the given locations are not hotspots only in terms of a significant number of users present at them at a specific time. Based on the analysis of the example network trace, these locations are application hotspots as well—large groups of user show common "cyber behavior" at these hotspot locations.

Figure 3D:
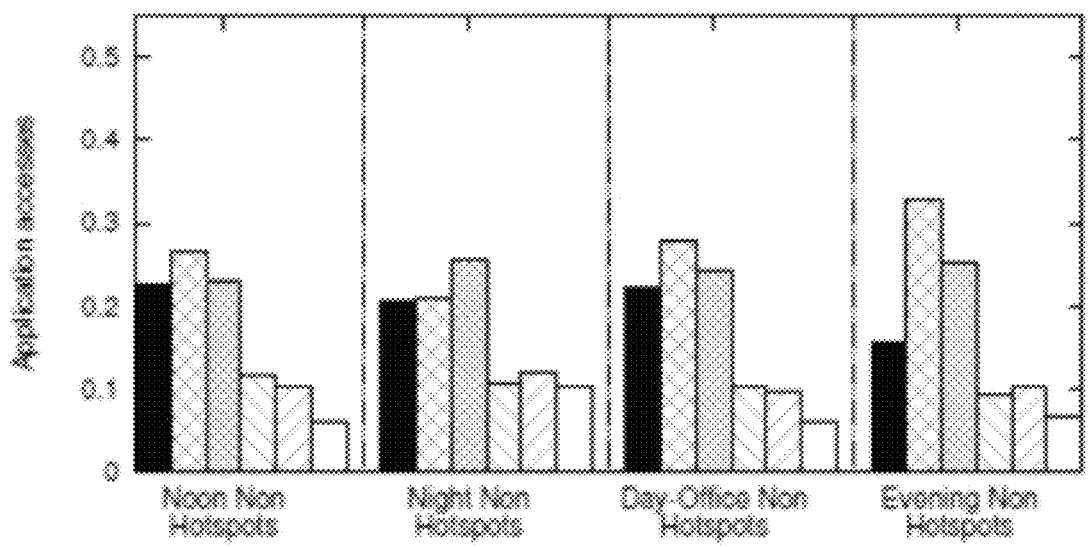

FIG. 3D shows the time of-day effect by plotting the application accesses of users outside the hotspots, yet at the same time periods when a hotspot occurs. For example, consider the locations which are not a hotspot at noon, referred to as noon non-hotspots. For these noon non-hotspots, statistics of user accesses in the same time period 12-2 PM shows a different trend than the one shown in FIG. 3C. As an example, at noon, social networking is not accessed as frequently at the noon non-hotspots. In the evening, dating is the least accessed application outside evening hot spots, etc}. Hence, time-of-day does not dominantly affect the accesses at hotspots based on the analysis of the example network trace.

Figure 3E:
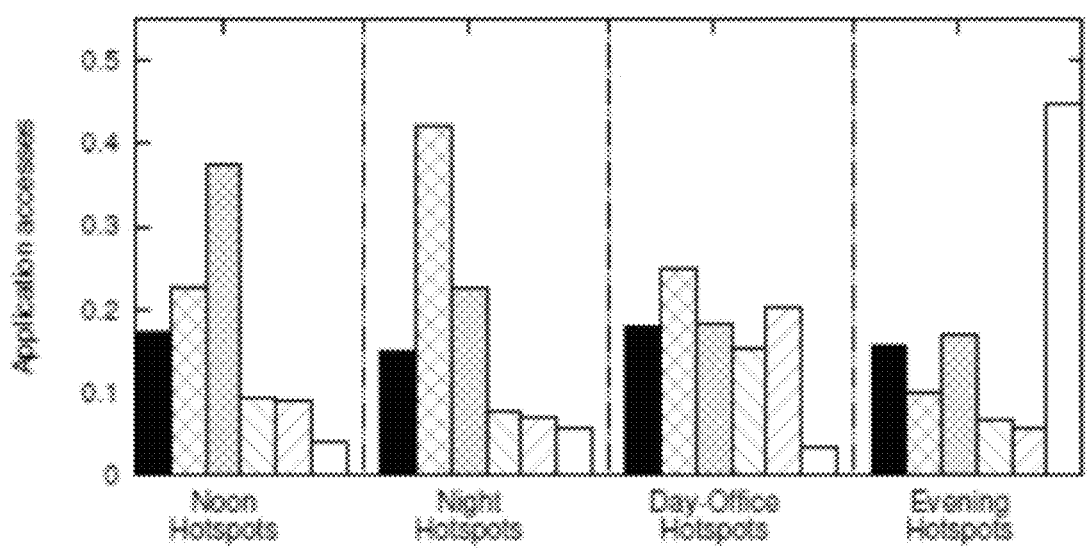

FIG. 3E shows that location dominantly determines the bias in application accesses observed at hotspots. In particular, the number of accesses is plotted at the hotspot locations outside the time period that characterizes the given hotspot. The results show the same trends as observed at hotspots in FIG. 3C.

In particular, music is the leading application at locations corresponding to night hotspots even during the daytime as well; social networking is the leading application at locations corresponding at noon hotspots even outside noon intervals; dating is the leading application at locations corresponding to evening hotspots even during non-evening periods. Only in the case of day (office) hotspots, the leading application is no longer e-mail, but music. Music prevails in these areas as they are dominated by residential customers during nights.

Individual users do not span the entire metropolitan area. Hence, the probability for one user to meet another user from a different part of the area might be small. Thus, to fully understand the potential for serendipitous location-based services, the metropolitan area is split into smaller regions by clustering groups of user who access the network from similar locations (or base-stations). For example, users interested in music may be prompted when they are in proximity and may decide to meet up. In one or more embodiments, regions (composed of locations) are identified and users are associated with a certain region based on the time they spend in the region. In one or more embodiments, users and locations are modeled as a bipartite graph over which a co-clustering across users and locations is performed to identify a one-to-one correspondence between a cluster of users and a corresponding cluster of locations. In this regards, co-clustering may be considered as a graph partitioning problem that is NP-hard.

To solve this NP-hard graph partitioning problem for the aforementioned example network trace, let u=281394 be the total number of users, l=1196 be total number of locations. The vertices of graph G comprise of all users and locations, for a total of (u+l) vertices. In the graph G, an edge connects a user i to a location j if the user has spent time in that location resulting in 936,280 edges. Each edge is given a weight W(i,j) as the amount of time (e.g., in seconds) spent by a user in that location and a weight 0 if a user has never visited the location. By definition of the bipartite graph, there are no edges between vertices of the same type, i.e., between users or between locations.

Denote A as the user-by-location matrix of dimension u times l with values A(i,j)=W(i,j). The multi-partitioning algorithm for co-clustering users and locations is as described below.

Algorithm 1 Multi-Partitioning Users and Locations in to k Clusters Each.

Define the Laplacian of the Graph G as:

$$L = \begin{pmatrix} D_1 & -A \\ -A^T & D_2 \end{pmatrix}$$

where, the squared diagonal matrix $D_1$ of size $u^2$ and $D_2$ of size $l^2$ are the following:

$$D_1(i,i) = \sum_{j=0}^{l} A(i,j) \text{ and } D_2(i,i) = \sum_{j=0}^{u} A(j,i).$$

Construct matrix: $A_n = D_1^{-1/2} A D_2^{-1/2}$.

Perform singular value decomposition on the $A_n$ matrix and starting from the second largest singular vectors (since the first one solves the decomposition trivially) obtain $[\log_2 k]$ singular left and right vectors each, and form matrices U and V respectively.

Construct the following matrix, on which we run K-means to obtain k clusters each for users and locations:

$$\begin{pmatrix} D_1^{-1/2} U \\ D_2^{-1/2} V \end{pmatrix}.$$

The number of connected components in the graph G is given by the number of trivial singular vectors of the graph Laplacian. One trivial singular vector is obtained, implying that the dynamics of human movement connects the entire metropolitan area in to one giant connected component. Still within this giant connected component, location clusters exist on account of the fact that a corresponding cluster of users spends majority of time within a location cluster.

In an example, multi-partitioning algorithm is applied with different values for the number of desired clusters k and across multiple runs of the algorithm, the same five significant regions are always identified and shown in TABLE 3 below.

TABLE 3

User and location clusters.

| Cluster | 1 | 2 | 3 | 4 | 5 |
|---|---|---|---|---|---|
| Nr. users | 54,589 | 41,845 | 40,569 | 82,389 | 17,148 |
| Nr. locations | 162 | 216 | 194 | 257 | 118 |
| Day Hot. | 0 | 3 | 4 | 15 | 1 |
| Noon Hot. | 9 | 2 | 5 | 10 | 2 |
| Evening Hot. | 3 | 0 | 0 | 4 | 1 |
| Night Hot. | 27 | 3 | 4 | 26 | 2 |

As shown in TABLE 3, Cluster 4 is the largest. It covers the downtown area, and it clusters together around 82 k users. Cluster 1 and Cluster 3 are suburbs that immediately border the downtown, with cluster 1 being more urban. Clusters 2 and 4 are suburbs located farther away from the downtown. Based on the analysis of the example network trace, the average number of users per base-station reveals the more urban nature of clusters 4 and 1 relative to other clusters. The average number of users per base-station in these two clusters is above 320, while for the other three clusters it is below 200 on average. Empirically, the density of users is higher in urban areas. The urban nature of clusters 4 and 1 is further revealed via the number of hotspots that occur in these regions. For example, as many as 55 and 39 hotspots reside in clusters 4 and 1, respectively. To the contrary, less than 10 hotspots on average reside in the other three regions. Moreover, the number of day hotspots is as high as 15 in region 4, while it is zero in region 1. As we mentioned above, cluster 4 covers the business part of the downtown area, and all day hotspots reside there. Although cluster 1 is urban, it is more residential; hence, no day hotspots occur.

TABLE 4 below presents the statistics for inner- and outer-cluster user movement, defined by whether the two endpoints involved in a movement rule belong to the same cluster (i.e., inner-cluster user movement) or different cluster (i.e., outer-cluster user movement).

TABLE 4

Breakdown of movement by users in a cluster and across clusters.

| Movement [%] | Src. 1 | Src. 2 | Src. 3 | Src. 4 | Src. 5 |
|---|---|---|---|---|---|
| Dest 1 | 70.4 | 1.7 | 2.3 | 13.1 | 0.2 |
| Dest 2 | 1.5 | 63.5 | 18.9 | 1.4 | 22.5 |
| Dest 3 | 2.1 | 21.7 | 60.6 | 7.3 | 5.1 |
| Dest 4 | 25.9 | 2.9 | 16.3 | 77.7 | 2.3 |
| Dest 5 | 0.1 | 10.2 | 1.9 | 0.5 | 69.9 |

As shown in TABLE 4, the majority of users move within their clusters, as the percents on the diagonal positions in the table are the largest for each of the columns. Secondly, even if users move outside their cluster, they are most likely to visit the neighboring urban area (25% from 1 to 4, and 13% from 4 to 1). Thirdly, users from suburbs rarely visit downtown; they are more likely to visit neighboring suburbs. Indeed, most of the movement shown in TABLE 4 reflect geographic relationships, i.e., 1 and 4 are neighbors; so are 2 and 3, 2 and 5, as well as 3 and 4.

The analysis results from the example network trace may be used to explore how probable it is, and what determines the probability, for user who share the same interests in the cyber domain to meet as part of their daily activities. For example, the following interest categories: social networking, dating, and music, are considered for their potential to trigger serendipitous interactions.

Given a set of users with the same interest, i.e., those who have accessed websites relevant to the interest type, either at current time at current location or at some time before reaching the current location, two interaction metrics are calculated as follows.

Time-independent interactions relates to the overlap in trajectories between users of the same interest, irrespective of the actual time of overlap. In one or more embodiments, this information is used to enhance user experience of location-based tagging services where users leave geo-tags for a location which can be picked by other users who are in its vicinity. For example, information associated with such LBS may be cached at base stations in the vicinity where the trajectories overlap. In another example, quality of server (QOS) for such LBS may be elevated in the vicinity where the trajectories overlap.

Time-dependent interactions relates to users with same interest that are present in the same location at the same time instance. In one or more embodiments, this information is used to enhance user experience of location-aware mobile social networking, and other location-based services. For example, information associated with such LBS may be cached at base stations in the vicinity where the trajectories overlap. In another example, quality of server (QOS) for such LBS may be elevated in the vicinity where the trajectories overlap.

Although specific formats, structures, or partitions are used as examples in the foregoing description regarding the various components in the user mobility pattern and application category correlation tool, user system, and cellular data service network, one skilled in the art, with the benefit of this disclosure, will recognize that other formats or structures may also be used in the system, methods, and examples described without deviating from the spirit of the invention.

Figure 4:
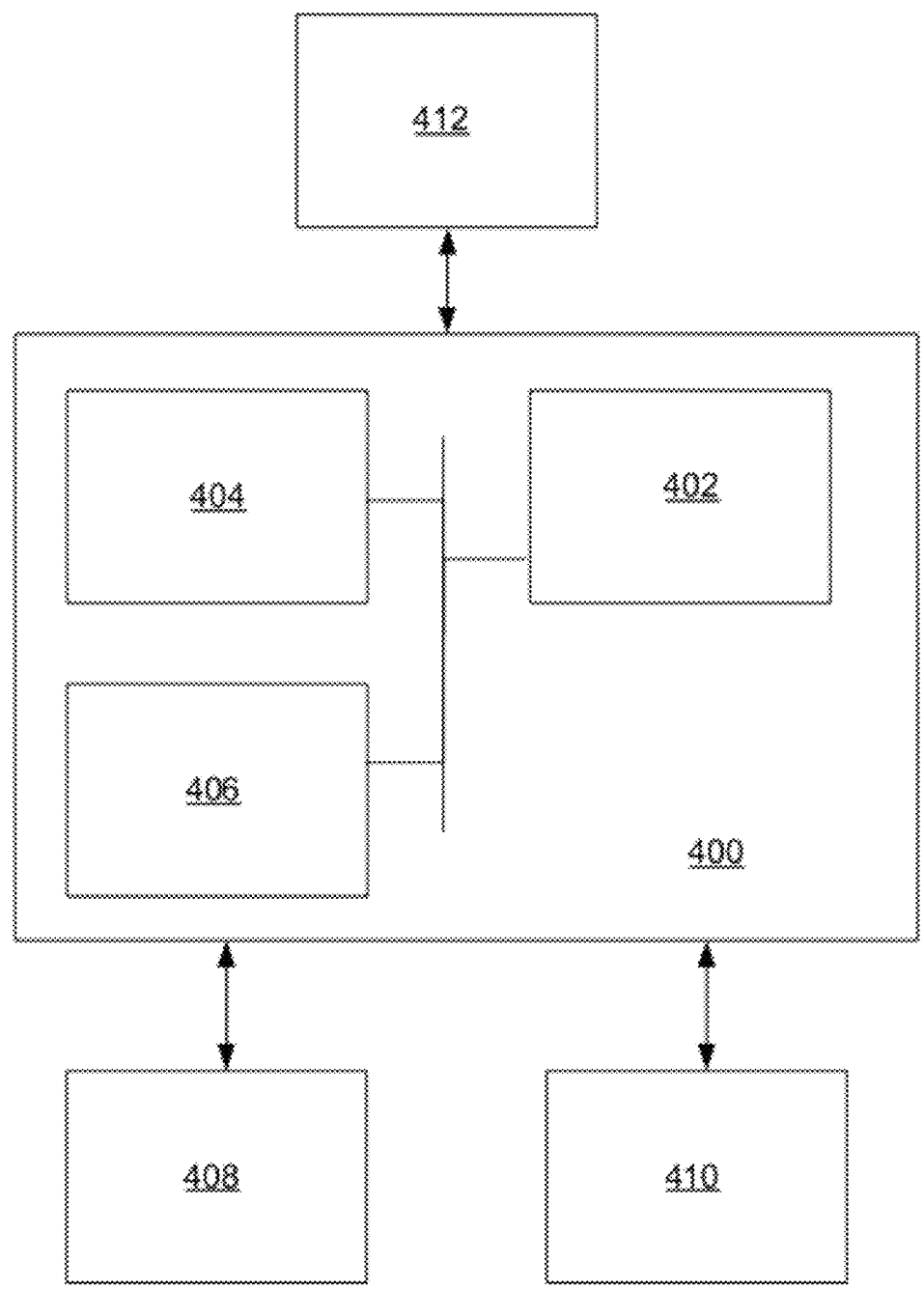
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402) (e.g., central processing unit or CPU), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1A) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing location based service in a cellular data service network (CDSN) having a plurality of base stations, comprising:
    obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets;
    analyzing, using a central processing unit (CPU) of a computer, the plurality of accounting data packets to determine a user mobility pattern representing a statistical pattern of time correlated user base station connections of at least the portion of the users in the CDSN, comprising:
        formulating a plurality of binary rules for association rule mining of the plurality of accounting data packets, wherein each of the plurality of binary rules is associated with a proposition of an antecedent implying an consequent and corresponds to a hypothetical user mobility pattern, wherein the antecedent states a first connection to a source base station within a time window with a pre-determined start time, wherein the consequent states a second connection to a target base station within a pre-determined time duration subsequent to the first connection;
        performing the association rule mining of the plurality of accounting data packets based on the plurality of binary rules to generate a confidence probability of the hypothetical user mobility pattern; and
        identifying the hypothetical user mobility pattern as the user mobility pattern in response to the confidence probability exceeding a pre-determined threshold;
    classifying, using the CPU, each of the plurality of application data packets as belonging to one or more of a plurality of pre-determined application categories based on keyword search;
    analyzing, using the CPU, the plurality of accounting data packets and the plurality of application data packets, based on network addresses and timestamps contained therein, to associate the user mobility pattern and a pre-determined application category of the plurality of pre-determined application categories;
    comparing, in response to receiving by the CDSN an accounting data packet associated with a first user of the users, the accounting data packet and the user mobility pattern to identify a match; and
    providing, in response to identifying the match, the location based service to the first user based on the pre-determined application category.

2. The method of claim 1, further comprising: analyzing the plurality of accounting data packets to identify a plurality of user mobility events; and identifying a portion of the plurality of user mobility events each comprising a first timestamp consistent with a timing condition of the hypothetical mobility pattern, wherein generating the confidence probability comprises tallying the portion of the plurality of user mobility events, wherein associating the user mobility pattern and the pre-determined application category comprises associating the portion of the plurality of user mobility events and an application data packet of the plurality of application data packets based on a comparison of the first timestamp and a second timestamp contained in the application data packet, wherein each of the portion of the plurality of user mobility events and the application data packet comprises a network address of the network addresses assigned to a connection session for connecting a second user of the plurality of users to the CDSN, wherein the portion of the plurality of user mobility events further comprises a user identifier identifying the second user.

3. The method of claim 1, wherein the match is identified if a timestamp of the accounting data packet and a timing condition of the user mobility pattern correspond to at least one selected from a group consisting of a same time window in a day, a same time window in a week, a same time window in a month, and a same time in a year.

4. The method of claim 1, wherein providing the location based service to the first user based on the pre-determined application category comprises: identifying a hotspot associated with the user mobility pattern, wherein the accounting data packet associated with the first user indicates that the first user is in the hotspot; and in response to identifying the location based service as associated with the pre-determined application category, enhancing user experience by at least one selected from a group consisting of caching information associated with the location based service at the hotspot and increasing quality of service of the location based service at the hotspot.

5. The method of claim 1, wherein the plurality of accounting data packets comprise a RADIUS (Remote Authentication Dial In User Service) accounting protocol data packet, wherein the plurality of application data packets comprise a HTTP (Hypertext Transfer Protocol) data packet comprising a URL (Uniform Resource Locator) associated with the LBS, and wherein the network addresses comprise an IP (Internet Protocol) address.

6. The method of claim 1, wherein the plurality of base stations comprise at least one selected from a group consisting of a cellular phone network base station, a Wi-Fi access point, a WiMax (Worldwide Interoperability for Microwave Access) base station, and a 3GPP LTE (Third Generation Partnership Project Long Term Evolution) base station.

7. A system for providing location based service in a cellular data service network (CDSN), comprising:
a plurality of base stations of the CDSN; a processor; and memory storing instructions, when executed by the processor, comprising functionalities for:
obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets;
analyzing the plurality of accounting data packets to determine a user mobility pattern representing a statistical pattern of time correlated user base station connections of at least the portion of the users in the CDSN, comprising:
formulating a plurality of binary rules for association rule mining of the plurality of accounting data packets, wherein each of the plurality of binary rules is associated with a proposition of an antecedent implying an consequent and corresponds to a hypothetical user mobility pattern, wherein the antecedent states a first connection to a source base station within a time window with a pre-determined start time, wherein the consequent states a second connection to a target base station within a pre-determined time duration subsequent to the first connection;
performing the association rule mining of the plurality of accounting data packets based on the plurality of binary rules to generate a confidence probability of the hypothetical user mobility pattern; and identifying the hypothetical user mobility pattern as the user mobility pattern in response to the confidence probability exceeding a pre-determined threshold;
classifying each of the plurality of application data packets as belonging to one or more of a plurality of pre-determined application categories based on keyword search;
analyzing the plurality of accounting data packets and the plurality of application data packets, based on network addresses and timestamps contained therein, to associate the user mobility pattern and a pre-determined application category of the plurality of pre-determined application categories;
comparing, in response to receiving by the CDSN an accounting data packet associated with a first user of the users, the accounting data packet and the user mobility pattern to identify a match; and
providing, in response to identifying the match, the location based service to the first user based on the pre-determined application category.

8. The system of claim 7, the instruction when executed by the processor further comprising functionality for:
analyzing the plurality of accounting data packets to identify a plurality of user mobility events; and identifying a portion of the plurality of user mobility events each comprising a first timestamp consistent with a timing condition of the hypothetical mobility pattern, wherein generating the confidence probability comprises tallying the portion of the plurality of user mobility events, wherein associating the user mobility pattern and the pre-determined application category comprises associating the portion of the plurality of user mobility events and an application data packet of the plurality of application data packets based on a comparison of the first timestamp and a second timestamp contained in the application data packet, wherein each of the portion of the plurality of user mobility events and the application data packet comprises a network address of the network addresses assigned to a connection session for connecting a second user of the plurality of users to the CDSN, wherein the portion of the plurality of user mobility events further comprises a user identifier identifying the second user.

9. The system of claim 7, wherein the match is identified if a timestamp of the accounting data packet and a timing condition of the user mobility pattern correspond to at least one selected from a group consisting of a same time window in a day, a same time window in a week, a same time window in a month, and a same time in a year.

10. The system of claim 7, wherein providing the location based service to the first user based on the pre-determined application category comprises: identifying a hotspot associated with the user mobility pattern, wherein the accounting data packet associated with the first user indicates that the first user is in the hotspot; and in response to identifying the location based service as associated with the pre-determined application category, enhancing user experience by at least one selected from a group consisting of caching information associated with the location based service at the hotspot and increasing quality of service of the location based service at the hotspot.

11. The system of claim 7, wherein the plurality of accounting data packets comprise a RADIUS (Remote Authentication Dial In User Service) accounting protocol data packet, wherein the plurality of application data packets comprise a HTTP (Hypertext Transfer Protocol) data packet comprising a URL (Uniform Resource Locator) associated with the LBS, and wherein the network addresses comprise an IP (Internet Protocol) address.

12. The system of claim 7, wherein the plurality of base stations comprise at least one selected from a group consisting of a cellular phone network base station, a Wi-Fi access point, a WiMax (Worldwide Interoperability for Microwave Access) base station, and a 3GPP LTE (Third Generation Partnership Project Long Term Evolution) base station.

13. A non-transitory computer readable medium storing instructions for providing
location based service in a cellular data service network (CDSN) having a plurality of base stations, the instructions, when executed by a processor of a computer, comprising functionality for: obtaining, from the CDSN, a plurality of accounting data packets and a plurality of application data packets associated with at least a portion of users of the CDSN, wherein the plurality of accounting data packets comprises metering information of CDSN usage by at least the portion of the users for transmitting the plurality of application data packets;
analyzing, using a central processing unit (CPU) of a computer, the plurality of accounting data packets to determine a user mobility pattern representing a statistical pattern of time correlated user base station connections of at least the portion of the users in the CDSN, comprising;
formulating a plurality of binary rules for association rule mining of the plurality of accounting data packets, wherein each of the plurality of binary rules is associated with a proposition of an antecedent implying an consequent and corresponds to a hypothetical user mobility pattern, wherein the antecedent states a first connection to a source base station within a time window with a pre-determined start time, wherein the consequent states a second connection to a target base station within a pre-determined time duration subsequent to the first connection;

performing the association rule mining of the plurality of accounting data packets based on the plurality of binary rules to generate a confidence probability of the hypothetical user mobility pattern; and identifying the hypothetical user mobility pattern as the user mobility pattern in response to the confidence probability exceeding a pre-determined threshold;

classifying, using the CPU, each of the plurality of application data packets as belonging to one or more of a plurality of pre-determined application categories based on keyword search;

analyzing, using the CPU, the plurality of accounting data packets and the plurality of application data packets, based on network addresses and timestamps contained therein, to associate the user mobility pattern and a pre-determined application category of the plurality of pre-determined application categories;

comparing, in response to receiving by the CDSN an accounting data packet associated with a first user of the users, the accounting data packet and the user mobility pattern to identify a match; and providing, in response to identifying the match, the location based service to the first user based on the pre-determined application category.

14. The non-transitory computer readable medium of claim 13, the instructions, when executed by the processor, further comprising functionality for:

analyzing the plurality of accounting data packets to identify a plurality of user mobility events; and identifying a portion of the plurality of user mobility events each comprising a first timestamp consistent with a timing condition of the hypothetical mobility pattern, wherein generating the confidence probability comprises tallying the portion of the plurality of user mobility events, wherein associating the user mobility pattern and the pre-determined application category comprises associating the portion of the plurality of user mobility events and an application data packet of the plurality of application data packets based on a comparison of the first timestamp and a second timestamp contained in the application data packet, wherein each of the portion of the plurality of user mobility events and the application data packet comprises a network address of the network addresses assigned to a connection session for connecting a second user of the plurality of users to the CDSN, wherein the portion of the plurality of user mobility events further comprises a user identifier identifying the second user.

15. The non-transitory computer readable medium of claim 13, wherein the match is identified if a timestamp of the accounting data packet and a timing condition of the user mobility pattern correspond to at least one selected from a group consisting of a same time window in a day, a same time window in a week, a same time window in a month, and a same time in a year.

16. The non-transitory computer readable medium of claim 13, wherein providing the location based service to the first user based on the pre-determined application category comprises:

identifying a hotspot associated with the user mobility pattern, wherein the accounting data packet associated with the first user indicates that the first user is in the hotspot; and in response to identifying the location based service as associated with the pre-determined application category, enhancing user experience by at least one selected from a group consisting of caching information associated with the location based service at the hotspot and increasing quality of service of the location based service at the hotspot.

17. The non-transitory computer readable medium of claim 13, wherein the plurality of accounting data packets comprise a RADIUS (Remote Authentication Dial In User Service) accounting protocol data packet, wherein the plurality of application data packets comprise a HTTP (Hypertext Transfer Protocol) data packet comprising a URL (Uniform Resource Locator) associated with the LBS, and wherein the network addresses comprise an IP (Internet Protocol) address.

18. The non-transitory computer readable medium of claim 13, wherein the plurality of base stations comprise at least one selected from a group consisting of a cellular phone network base station, a Wi-Fi access point, a WiMax (Worldwide Interoperability for Microwave Access) base station, and a 3GPP LTE (Third Generation Partnership Project Long Term Evolution) base station.

* * * * *